(12) United States Patent
Taki et al.

(10) Patent No.: US 12,131,004 B2
(45) Date of Patent: Oct. 29, 2024

(54) INFORMATION PROCESSING DEVICE, INFORMATION PROCESSING METHOD, DISPLAY DEVICE, AND DISPLAY METHOD

(71) Applicant: Sony Group Corporation, Tokyo (JP)

(72) Inventors: Yuhei Taki, Tokyo (JP); Hiro Iwase, Tokyo (JP); Kunihito Sawai, Tokyo (JP); Mari Saito, Tokyo (JP); Masaki Takase, Tokyo (JP); Akira Miyashita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/777,617

(22) PCT Filed: Oct. 14, 2020

(86) PCT No.: PCT/JP2020/038713
§ 371 (c)(1),
(2) Date: May 18, 2022

(87) PCT Pub. No.: WO2021/106403
PCT Pub. Date: Jun. 3, 2021

(65) Prior Publication Data
US 2022/0413662 A1    Dec. 29, 2022

(30) Foreign Application Priority Data
Nov. 27, 2019 (JP) ................................ 2019-214425

(51) Int. Cl.
*G06F 3/048* (2013.01)
*G06F 3/0482* (2013.01)
(Continued)

(52) U.S. Cl.
CPC ............. *G06F 3/0482* (2013.01); *G06F 3/167* (2013.01); *A63F 13/533* (2014.09); *A63F 2300/308* (2013.01); *G06F 3/04847* (2013.01)

(58) Field of Classification Search
CPC ..... G06F 3/0482; G06F 3/04847; G06F 3/167
See application file for complete search history.

(56) References Cited

U.S. PATENT DOCUMENTS

| 2008/0112621 A1* | 5/2008 | Gallagher | ............ G06V 40/172 |
| | | | 382/190 |
| 2012/0256832 A1* | 10/2012 | Honda | .................... G06F 9/451 |
| | | | 345/157 |

(Continued)

FOREIGN PATENT DOCUMENTS

| JP | 2005-352730 A | 12/2005 |
| JP | 2012-248016 A | 12/2012 |

(Continued)

OTHER PUBLICATIONS

International Search Report and Written Opinion mailed on Dec. 8, 2020, received for PCT Application PCT/JP2020/038713, Filed on Oct. 14, 2020, 8 pages including English Translation.

*Primary Examiner* — Claudia Dragoescu
(74) *Attorney, Agent, or Firm* — XSENSUS LLP

(57) ABSTRACT

An information processing device according to the present disclosure includes: an acquisition unit that acquires, from a terminal device, input information input to the terminal device by a user; a generation unit that generates content of displaying an input item of each of functions including a corresponding input item that is an input item corresponding to the input information; and a transmission unit that transmits the content generated by the generation unit to the terminal device.

20 Claims, 19 Drawing Sheets

(51) Int. Cl.
    *G06F 3/16*     (2006.01)
    *A63F 13/533*     (2014.01)
    *G06F 3/04847*     (2022.01)

(56) References Cited

U.S. PATENT DOCUMENTS

| | | | |
|---|---|---|---|
| 2013/0110940 A1* | 5/2013 | Pasquero | H04M 1/72451 709/206 |
| 2014/0089314 A1* | 3/2014 | Iizuka | G06F 16/9535 707/740 |
| 2017/0249393 A1* | 8/2017 | Nair | G06F 16/25 |
| 2017/0346769 A1* | 11/2017 | McCray | H04L 51/226 |

FOREIGN PATENT DOCUMENTS

| | | |
|---|---|---|
| JP | 2014-224957 A | 12/2014 |
| WO | 2011/037230 A1 | 3/2011 |

\* cited by examiner

| FUNCTION | INPUT ITEM (ESSENTIAL) | | | INPUT ITEM (OPTIONAL) | | ... |
|---|---|---|---|---|---|---|
| | #1 | #2 | ... | #1 | ... | |
| Invitation | Game | Friend | ... | Message | ... | ... |
| Message | Friend | Message | ... | - | ... | ... |
| VoiceChat | Friend | Setting | ... | - | ... | ... |
| ... | ... | ... | ... | ... | ... | ... |

121

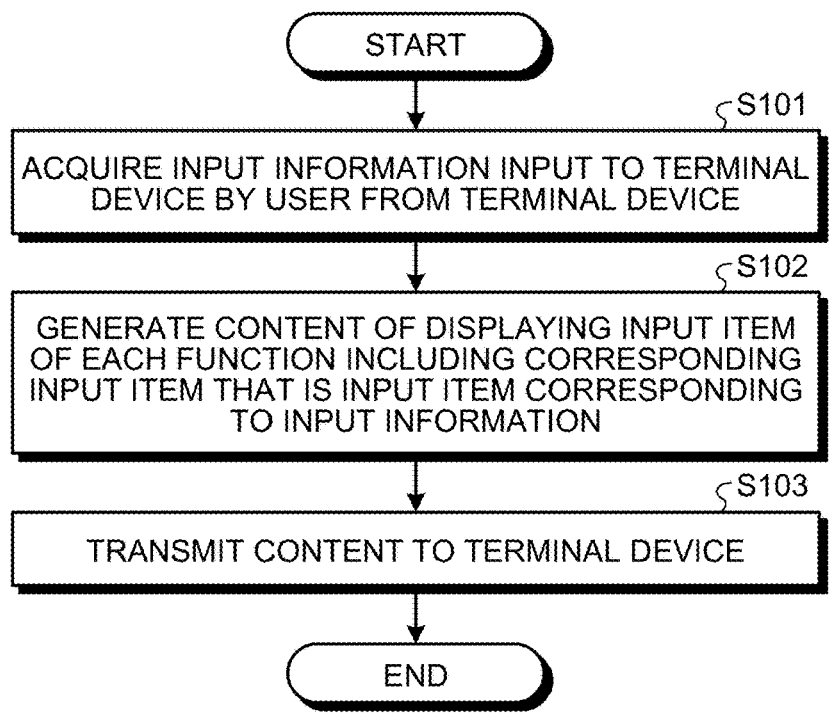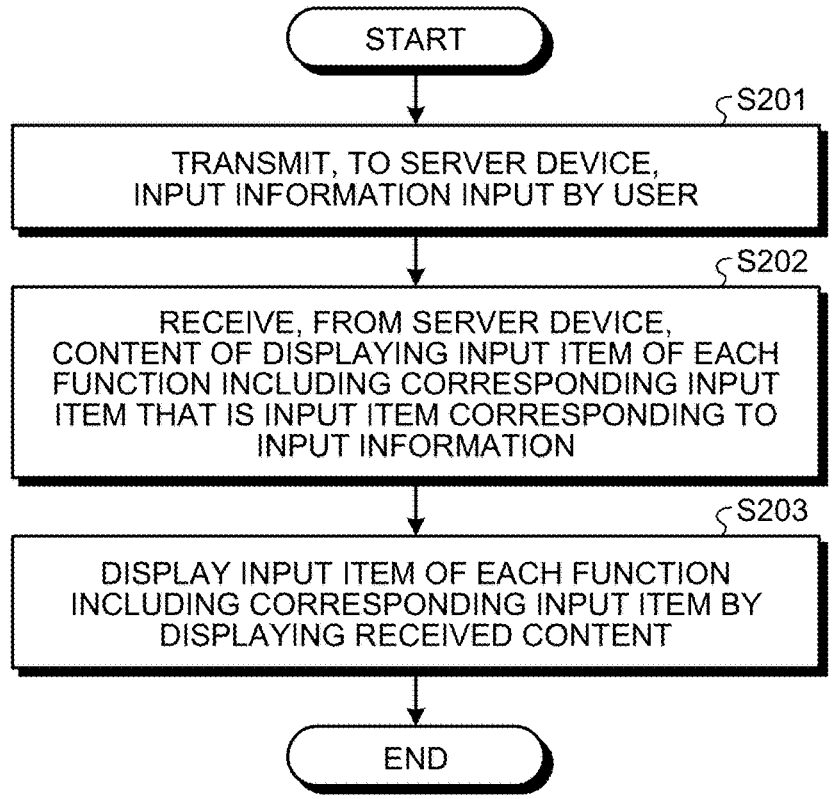

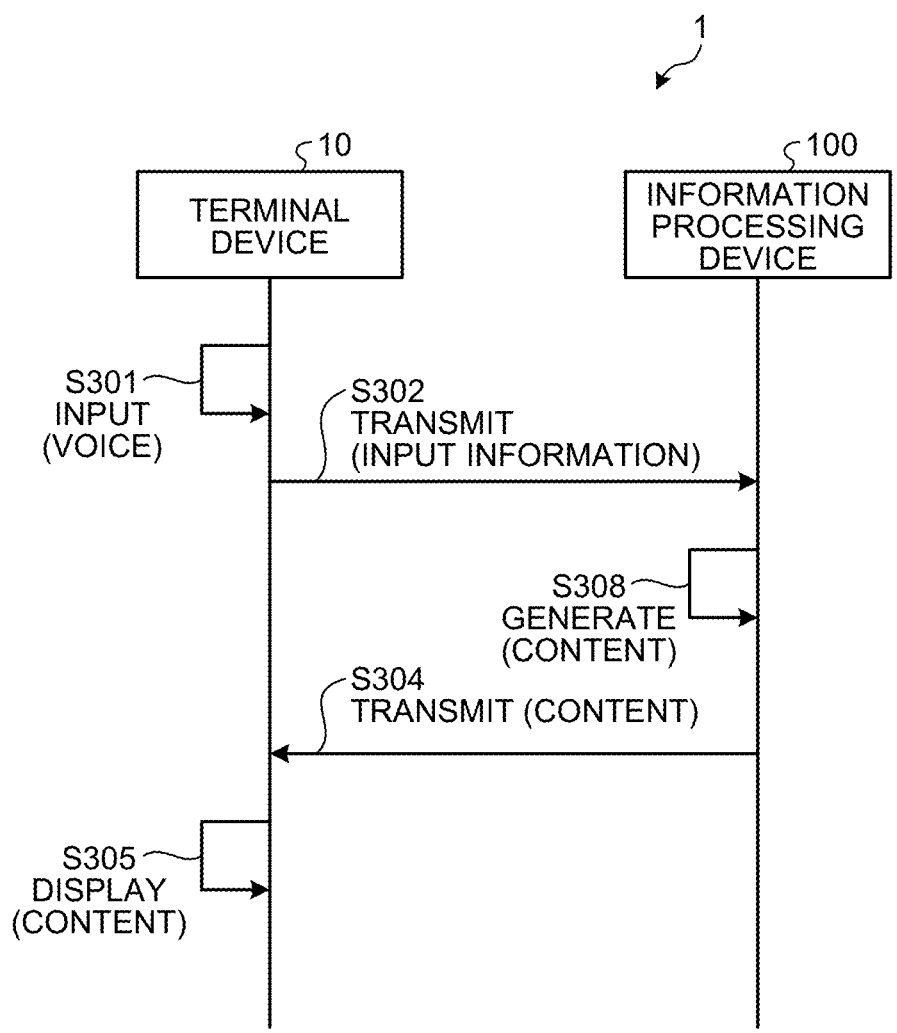

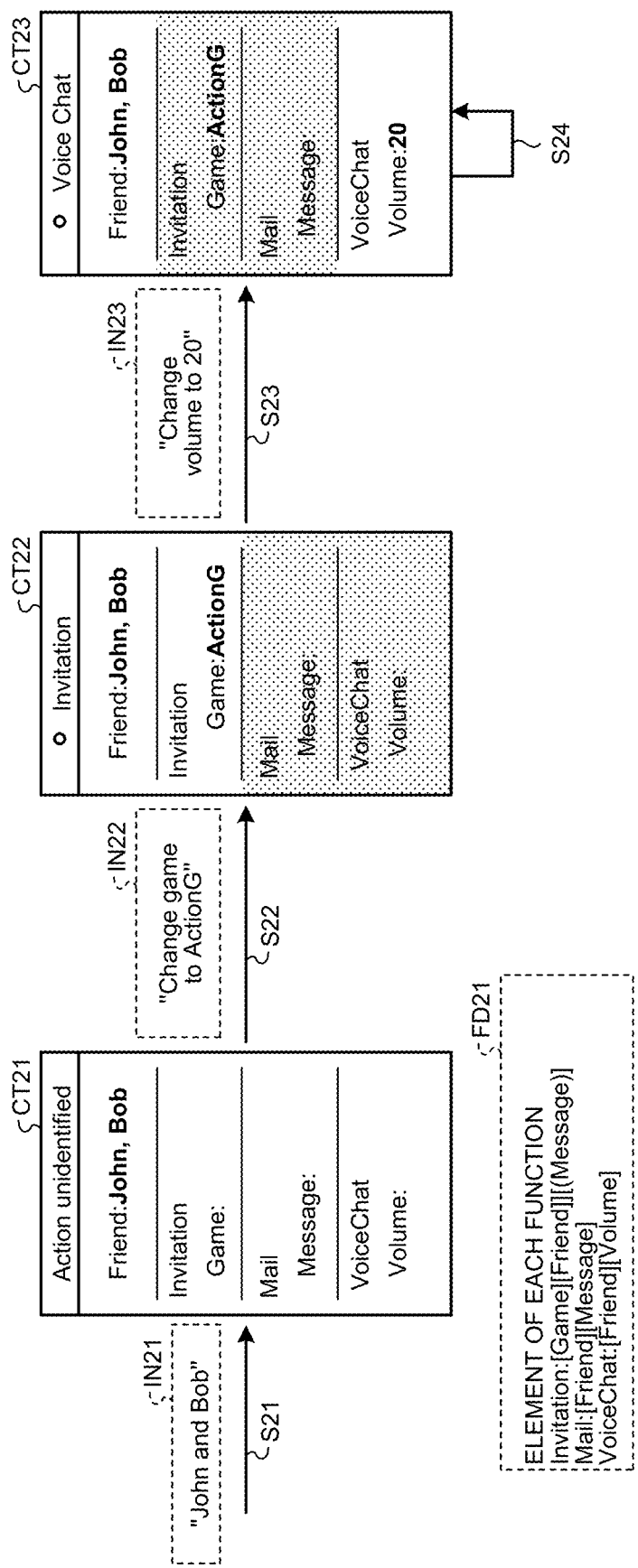

INFORMATION PROCESSING DEVICE, INFORMATION PROCESSING METHOD, DISPLAY DEVICE, AND DISPLAY METHOD

FIELD

The present disclosure relates to an information processing device, an information processing method, a display device, and a display method.

BACKGROUND

In recent years, with development of technology, methods of performing an input or control on a device have been diversified. For example, a technology of receiving, as an input, voice of speech or the like by a user or operation on a terminal device or the like by the user, and executing a function corresponding to the received input has been known.

In addition, a technology of changing contents to be displayed according to a situation has been provided. For example, in Patent Literature 1, in a case where an image corresponding to a situation of usage of content is displayed, a change is given to the displayed image and a display position thereof.

CITATION LIST

Patent Literature

Patent Literature 1: JP 2014-224957 A

SUMMARY

Technical Problem

According to the related art, a displayed image and a display position thereof changes according to a situation of usage of content.

However, in the related art, it is not always possible to facilitate an input by a user. For example, the displayed image and the display position thereof are merely changed according to the situation of usage of the content in the related art, and it is difficult, for example, to dynamically change the display according to the input by the user.

Thus, the present disclosure proposes an information processing device, an information processing method, a display device, and a display method that can facilitate an input by a user.

Solution to Problem

According to the present disclosure, an information processing device includes an acquisition unit that acquires, from a terminal device, input information input to the terminal device by a user; a generation unit that generates content of displaying an input item of each of functions including a corresponding input item that is an input item corresponding to the input information; and a transmission unit that transmits the content generated by the generation unit to the terminal device.

BRIEF DESCRIPTION OF DRAWINGS

FIG. 6 is a flowchart illustrating a processing procedure of the information processing device according to the embodiment of the present disclosure.

FIG. 7 is a flowchart illustrating a processing procedure of a display device according to the embodiment of the present disclosure.

FIG. 8 is a sequence diagram illustrating a processing procedure of an information processing system according to the embodiment of the present disclosure.

FIG. 9 is a view illustrating an example of a display of an input item with a low correction cost.

DESCRIPTION OF EMBODIMENTS

In the following, embodiments of the present disclosure will be described in detail on the basis of the drawings. Note that these embodiments do not limit an information processing device, information processing method, display device, and display method according to the present application. Also, in each of the following embodiments, overlapping description is omitted by assignment of the same reference sign to the same parts.

The present disclosure will be described in the following order of items.

1. Embodiment
 1-1. Outline of information processing according to the embodiment of the present disclosure
  1-1-1. Conventional example and solutions
 1-2. Configuration of an information processing system according to the embodiment
 1-3. Configuration of an information processing device according to the embodiment
 1-4. Configuration of a terminal device according to the embodiment
 1-5. Procedure of the information processing according to the embodiment
  1-5-1. Procedure of processing related to the information processing device
  1-5-2. Procedure of processing related to the display device
  1-5-3. Procedure of processing related to the information processing system
 1-6. First display example of an input item with a low correction cost
 1-7. Second display example of the input item with the low correction cost
 1-8. Example of compact display without overlapping display
  1-8-1. Display example in the display device
 1-9. Processing example for other input items
  1-9-1. Processing example for an input item related to a place
  1-9-2. Processing example for an input item related to a program
 1-10. Display example of an input item in the display device
 1-11. Example of a relationship between display and a data structure
  1-11-1. Conventional example
  1-11-2. Example of a dialog format
 1-12. Display example of an input target
  1-12-1. Side panel
  1-12-2. Highlighting on the same panel
  1-12-3. Scaling on the same panel
 1-13. Display example of an executable function
 1-14. Display example of a plurality of candidates
 1-15. Display example of a macro
 1-16. Execution example of a plurality of functions
 1-17. Procedure of execution of a function related to the information processing system
2. Other Embodiments
 2-1. Other configuration examples
 2-2. Others
3. Effects according to the present disclosure
4. Hardware configuration 1. Embodiment

[1-1. Outline of Information Processing According to the Embodiment of the Present Disclosure]

Figure 1:
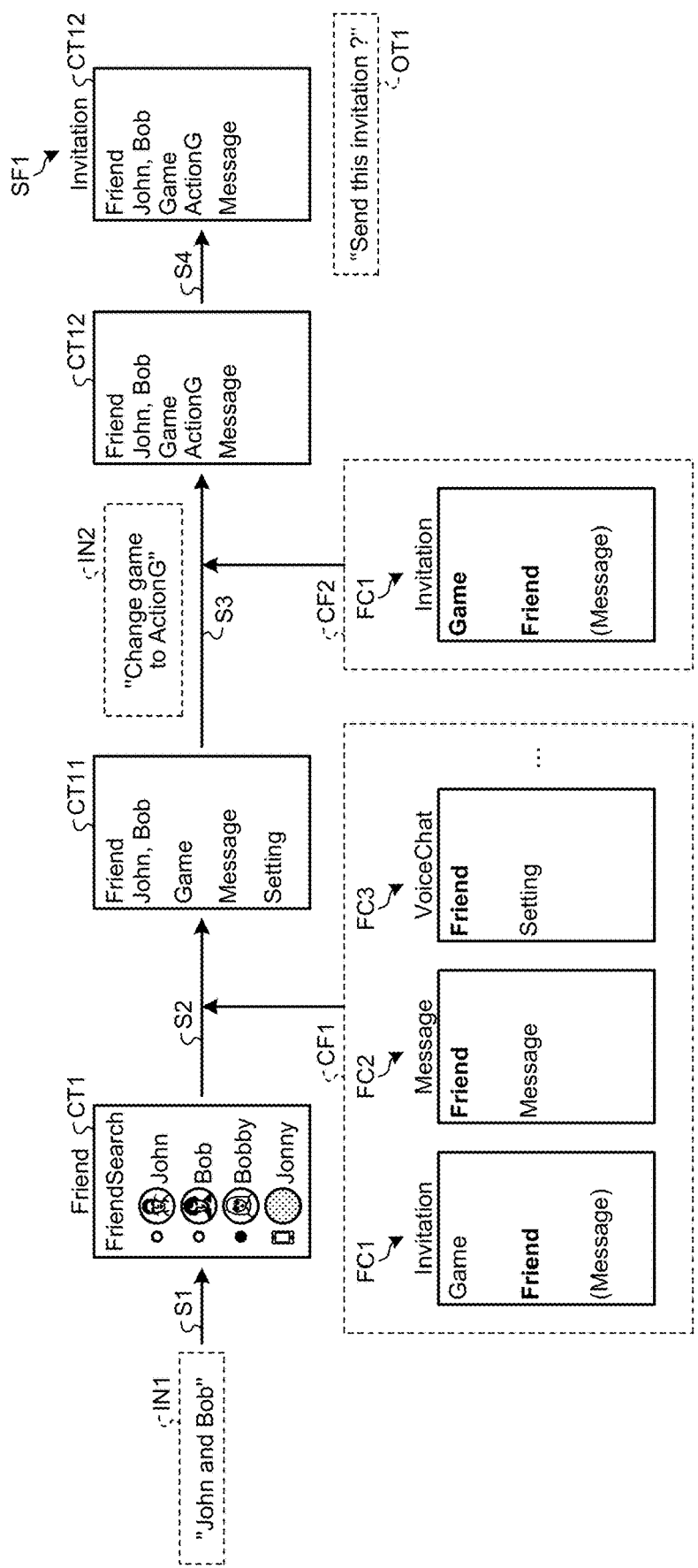
FIG. 1 is a view illustrating an example of information processing according to an embodiment of the present disclosure.

FIG. 1 is a view illustrating an example of the information processing according to the embodiment of the present disclosure. The information processing according to the embodiment of the present disclosure is realized by an information processing system 1 including an information processing device 100 and a terminal device 10 illustrated in FIG. 1.

The information processing device 100 is an information processing device that executes the information processing according to the embodiment. The information processing device 100 generates content by using input information input to the terminal device 10 by a user. Also, the terminal device 10 is a display device that executes display processing according to the embodiment. The terminal device 10 receives, from the information processing device 100, content of displaying an input item (also referred to as "element") of each function including an input item corresponding to input information input by the user (also referred to as "corresponding input item"), and displays the received content.

Note that although a voice input by the speech of the user will be mainly described in the example of FIG. 1, the input by the user is not limited to the voice and may be in various input modes such as operation on the terminal device 10 by the user. Furthermore, it is assumed that the information processing system 1 can recognize speech information according to the speech of the user and estimate contents of the speech by functions of natural language understanding (NLU) and automatic speech recognition (ASR). Note that any device of the information processing system 1 may have the functions of natural language understanding and automatic speech recognition. For example, the information processing device 100 or the terminal device 10 may have the functions of natural language understanding and automatic speech recognition. Furthermore, the information processing system 1 may include a speech recognition server having the functions of natural language understanding and automatic speech recognition. In the following, a case where the terminal device 10 converts speech (speech information) of the user into character information by the function of automatic speech recognition and transmits the converted character information to the information processing device 100 as input information will be described as an example. Also, a case where the information processing device 100 estimates (understands) contents of the character information (input information) acquired from the terminal device 10 by the function of natural language understanding will be described as an example.

Hereinafter, FIG. 1 will be specifically described. In the following, a case where a user U1 who uses the terminal device 10 performs an input will be described as an example. First, in the example of FIG. 1, the user U1 who uses the terminal device 10 speaks "John and Bob". The terminal device 10 detects the speech "John and Bob" by the user U1. Then, the terminal device 10 receives character information "John and Bob" as input information IN1 by the function of automatic speech recognition. Then, the terminal device 10 transmits the input information IN1 to the information processing device 100. As a result, the information processing device 100 acquires the input information IN1 from the terminal device 10.

Then, the information processing device 100 estimates intent of the input information IN1 by the function of natural language understanding. For example, the information processing device 100 estimates the intent of the input information IN1 by using technologies of natural language understanding, an entity analysis, and the like. In the example of FIG. 1, by the function of natural language understanding, the information processing device 100 estimates the intent of the input information IN1 is to search for a friend of the user U1. For example, the information processing device 100 extracts information of a user having a friendship with the user U1 among users stored in a user information storage unit 122 (see FIG. 3).

The information processing device 100 acquires status information of users (friend user) having the friendship with the user U1 from the user information storage unit 122, and generates content CT1 indicating status of the friend users (Step S1). For example, the information processing device 100 generates the content CT1 distinguishably indicating status information indicating whether a state is a first state in which the user is online on the terminal device 10 that is a first device, a second state in which the user is online on a second device (smartphone) other than the terminal device 10, or a third state. In FIG. 1, the information processing device 100 generates the content CT1 distinguishably indicating a user in the first state with a white circle, a user in the second state with an icon of a smartphone, and a user in the third state with a black circle. Specifically, the information processing device 100 generates the content CT1 that displays that John and Bob among the friend users of the user U1 are in the first state, displays that Jonny is in the second state, and displays that Bobby is in the third state.

Then, the information processing device 100 transmits the content CT1 to the terminal device 10. The terminal device 10 displays the content CT1. The user U1 performs, on the terminal device 10, operation of selecting John and Bob displayed in the content CT1. The terminal device 10 transmits, as input information, information indicating that the user U1 performs the operation of selecting John and Bob to the information processing device 100.

As a result, from the terminal device 10, the information processing device 100 acquires the input information indicating that the user U1 performs the operation of selecting John and Bob. On the basis of the input information of selecting John and Bob by the user U1, the information processing device 100 specifies that a corresponding input item corresponding to the input by the user U1 is an input item "Friend". Furthermore, the information processing device 100 sets "John" and "Bob" as parameters of the input item "Friend".

Note that the information processing device 100 may estimate that intent of the input information IN1 is the input of the input item "Friend" without causing a user U to select a user to be added to the input item "Friend" by the content CT1. In this case, by setting "John" and "Bob" in the input information IN1 as the parameters of the input item "Friend", the information processing device 100 may generate content CT11 without providing the content CT1 to the terminal device 10. A flow of this processing is illustrated in another drawing.

The information processing device 100 generates the content CT11 that displays an input item of each function including the input item "Friend" that is the corresponding input item corresponding to the input information of the user U1 (Step S2). First, the information processing device 100 extracts, from among the functions, the function including the input item "Friend" as the input item. For example, the information processing device 100 extracts, from among a plurality of functions stored in a function information storage unit 121 (see FIG. 4), the function including the input item "Friend" as the input item. The information processing device 100 compares the input item "Friend" with each of the input items of the plurality of functions stored in the function information storage unit 121, and extracts the function including the input item "Friend" as the input item. In the example of FIG. 1, as illustrated in a function group CF1, the information processing device 100 extracts a function "Invitation", a function "Message", a function "VoiceChat", and the like as the functions including the input item "Friend". Note that the input item "Friend" in the function group CF1 is indicated in bold in FIG. 1 in order to indicate that parameter setting is already performed for the input item.

As illustrated in function information FC1, it is indicated that the function "Invitation" includes "Game", "Friend", and "Message" as the input items. Note that it is indicated that a function enclosed in parentheses (parentheses), such as (Message) in the function information FC1 is an optional input item for execution. That is, with respect to the function "Invitation", it is indicated that "Game" and "Friend" are input items essential for execution of the function and "Message" is an input item optional for execution of the function.

In addition, as illustrated in function information FC2, it is indicated that the function "Message" includes "Friend" and "Message" as the input items. In addition, as illustrated in function information FC3, it is indicated that the function "VoiceChat" includes "Friend" and "Setting" as the input items.

Then, the information processing device 100 generates the content CT11 that displays a union of the input items of the function "Invitation", the function "Message", and the function "VoiceChat" including the input item "Friend". The information processing device 100 generates the content CT11 that displays the input items "Game", "Message", and "Setting" that are the input items of any of the function "Invitation", the function "Message", and the function "VoiceChat".

Here, in a case where a first input item of a first function including the corresponding input item and a second input item of a second function including the corresponding input item are common, the information processing device 100 generates content of displaying the input items of the functions with the first input item and the second input item as one input item. In the example of FIG. 1, since the input item "Message" of the function "Invitation" and the input item "Message" of the function "Message" are common, the information processing device 100 generates the content CT11 including only one input item "Message".

Furthermore, the information processing device 100 sets "John" and "Bob" as the parameters of the input item "Friend" that is the corresponding input item, and generates the content CT11. As a result, the information processing device 100 generates the content CT11 in which "John" and "Bob" are set as the parameters in the input item "Friend" and the three input items "Game", "Message", and "Setting" are displayed in a list as unset input items.

Then, the information processing device 100 transmits the content CT11 to the terminal device 10. The terminal device 10 displays the content CT11. In such a manner, the terminal device 10 can present, to the user U1, that the input items necessary for executing the function including the input item "Friend" are the input items "Game", "Message", "Setting", and the like after the parameter setting for the input item "Friend" is performed. As a result, the user U1 can recognize that the input items necessary for executing the function including the input item "Friend" are the input items "Game", "Message", "Setting", and the like after the parameter setting for the input item "Friend" is performed. Thus, the user U1 can easily perform the input after the parameter setting for the input item "Friend".

Then, the user U1 who checks the content CT11 speaks "Change game to ActionG". Note that it is assumed that "ActionG" is a name of a specific game. The terminal device 10 detects the speech "Change game to ActionG" by the user U1. Then, the terminal device 10 receives character information "Change game to ActionG" as input information IN2 by the function of automatic speech recognition. Then, the terminal device 10 transmits the input information IN2 to the information processing device 100. As a result, the information processing device 100 acquires the input information IN2 from the terminal device 10.

Then, the information processing device 100 estimates intent of the input information IN2 by the function of natural language understanding. In the example of FIG. 1, by the function of natural language understanding, the information processing device 100 estimates that the intent of the input information IN2 is to designate "ActionG" as a parameter of the input item "Game". Thus, the information processing device 100 determines to set "ActionG" as the parameter of the input item "Game". For example, the information processing device 100 specifies that a corresponding input item corresponding to the input by the user U1 is the input item "Game" on the basis of the input information IN2. Furthermore, the information processing device 100 sets "ActionG" as the parameter of the input item "Game".

The information processing device 100 generates content CT12 that displays an input item of each function including the input item "Game" that is the corresponding input item corresponding to the input information IN2 (Step S3). First, the information processing device 100 extracts a function including the input item "Game" as the input item from among the function "Invitation", the function "Message", and the function "VoiceChat" in the function group CF1. For example, the information processing device 100 extracts, from among the plurality of functions stored in the function information storage unit 121 (see FIG. 4), a function including the input item "Friend" as the input item. In the example of FIG. 1, as illustrated in a function group CF2, the information processing device 100 extracts the function "Invitation" as a function including the input item "Friend" and the input item "Game". Note that the input item "Friend" and the input item "Game" in the function group CF2 are indicated in bold in FIG. 1 in order to indicate that parameter setting is already performed for the input items. Note that the information processing device 100 may extract a function including the input item "Friend" and the input item "Game" as input items from among all of the functions stored in the function information storage unit 121.

The information processing device 100 generates the content CT12 in which "ActionG" is set as the parameter of the input item "Game" that is the corresponding input item, and "John" and "Bob" are set as the parameters of the input item "Friend". Furthermore, the information processing device 100 generates the content CT12 including the input item "Message" that is the optional input item of the function "Invitation". Note that since the input item "Setting" displayed in the content CT11 is not included in the input item of the function "Invitation", the information processing device 100 generates the content CT12 that does not include the input item "Setting". That is, the information processing device 100 generates the content CT12 display contents of which are changed from that of the content CT11 by displaying "ActionG" as the parameter of the input item "Game" and updating the content CT11 in such a manner as not to include the input item "Setting". As a result, the information processing device 100 generates the content CT12 in which "John" and "Bob" are set as the parameters in the input item "Friend", "ActionG" is set as the parameter of the input item "Game", and the input item "Message" is displayed in a list as the unset input item.

Then, the information processing device 100 transmits the content CT12 to the terminal device 10. The terminal device 10 displays the content CT12. As a result, the user U1 can recognize that the setting of the parameters to the input item "Friend" and the input item "Game" is completed. Thus, the user U1 can easily grasp a situation after the parameter setting performed for a plurality of times.

Then, the information processing device 100 determines a function to be a candidate of execution (Step S4). The information processing device 100 determines a function in which all parameters of essential input items are set among the functions as a candidate for execution of the function (also referred to as "execution candidate function"). In the example of FIG. 1, as illustrated in the function information FC1 in the function group CF2, the parameters are already set in the input item "Friend" and the input item "Game", which are the essential input items, in the function "Invitation". Thus, the information processing device 100 determines the function "Invitation" as the execution candidate function as illustrated in candidate information ST1.

Then, the information processing device 100 transmits, to the terminal device 10, information indicating that the execution candidate function is the function "Invitation". The terminal device 10 checks execution of the function "Invitation" with the user U1. The terminal device 10 outputs output information OT1 such as "Send this invitation?". Note that the terminal device 10 may output the output information OT1 by sound or may perform a display thereof as character information. As a result, the user U1 can check display contents of the content CT12 and determine whether to execute the function "Invitation". That is, the user U1 can determine whether to invite the friends John and Bob to the game "ActionG" on the basis of the content CT12.

As described above, according to the input by the user, the information processing device 100 generates content of displaying the input item of each function including the input item corresponding to the input by the user, and provides the content to the terminal device of the user. As a result, the information processing device 100 can facilitate the input by the user. In addition, the terminal device 10 displays the content of displaying the input item of each function including the input item corresponding to the input by the user. As a result, the terminal device 10 can facilitate the input by the user. In such a manner, the information processing system 1 determines a used function according to the information input by the user.

[1-1-1. Conventional Example and Solutions]

Conventionally, input order is defined on a system side. For example, in a case of the function "Invitation", the input order of the input item "Game", the input item "Friend", and the input item "Message" is defined. However, the user does not always perform the input in that order. For example, the user may decide a game and extend an invitation after selecting a friend (friend), or select an action/function itself after selecting a friend. For example, there is a case where selection whether to extend an invitation to a game or to start VoiceChat is performed after a friend is selected. However, in a case of the conventional uniform input order, the user cannot have flexibility in the above-described manner.

On the other hand, in the information processing system 1 described above, function candidates including the first input item are acquired, and input items included in these function candidates are simultaneously arranged and displayed in a list. As a result, in the information processing system 1, when the user advances the input with respect to an element desired to be input, the functions are automatically narrowed down to the corresponding function, and the expected function can be used. As described above, the information processing system 1 can facilitate the input by the user and enhance convenience in execution of the function by the user.

[1-2. Configuration of an Information Processing System According to the Embodiment]

Figure 2:
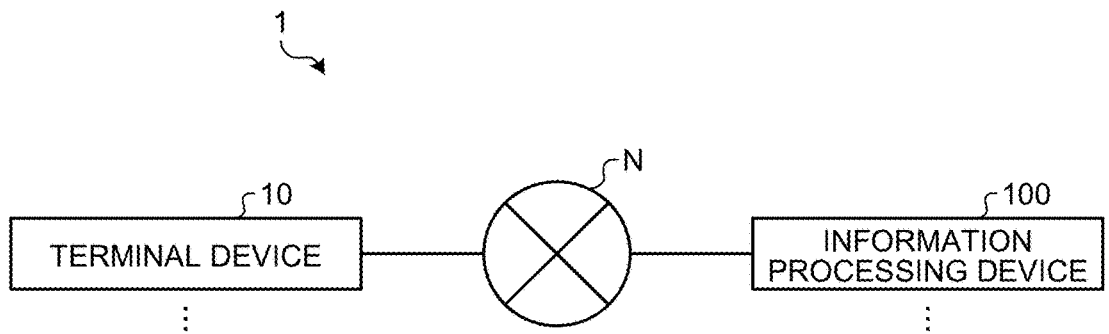
FIG. 2 is a view illustrating a configuration example of an information processing system according to the embodiment of the present disclosure.

The information processing system 1 illustrated in FIG. 2 will be described. As illustrated in FIG. 2, the information processing system 1 includes the terminal device 10 and the information processing device 100. The terminal device 10 and the information processing device 100 are communicably connected in a wired or wireless manner via a predetermined communication network (network N). FIG. 2 is a view illustrating a configuration example of the information processing system according to the embodiment. Note that the information processing system 1 illustrated in FIG. 2 may include a plurality of terminal devices 10 and a plurality of information processing devices 100.

The information processing device 100 is a computer that acquires, from the terminal device 10, input information input to the terminal device 10 by the user, and that generates content of displaying an input item of each function including a corresponding input item that is an input item corresponding to the input information. Furthermore, the information processing device 100 is a computer that transmits the generated content to the terminal device 10. The information processing device 100 is a server device used to provide services related to various functions.

Furthermore, the information processing device 100 may include software modules of speech signal processing, speech recognition, speech semantic analysis, and dialogue control. The information processing device 100 may have a function of speech recognition. For example, the information processing device 100 may have the functions of natural language understanding and automatic speech recognition. For example, the information processing device 100 may estimate information related to intent (intent) and entity (target) of the user from the input information by the speech of the user.

Furthermore, the information processing device 100 may be able to acquire information from a speech recognition server that provides a speech recognition service. In this case, the information processing system 1 may include the speech recognition server. For example, the information processing device 100 or the speech recognition server recognizes the speech of the user or specifies the user who speaks by appropriately using various related arts.

The terminal device 10 is a display device that displays, by displaying the content of displaying the input item of each function including the corresponding input item that is the input item corresponding to the input information, the input item of each function including the corresponding input item. Furthermore, the terminal device 10 is an information processing device that transmits the input information, which is input by the user, to the server device such as the information processing device 100, and that receives, from the server device, the content of displaying the input item of each function including the corresponding input item corresponding to the input information.

The terminal device 10 is device equipment used by the user. The terminal device 10 receives an input by the user. The terminal device 10 receives a voice input by the speech of the user or an input by operation by the user. The terminal device 10 displays information corresponding to the input by the user. The terminal device 10 may be any device as long as the processing in the embodiment can be realized. The terminal device 10 may be any device as long as a service related to dialogue is provided and a display (display unit 16) that displays information is included. For example, the terminal device 10 may be a device such as a television, a smartphone, a tablet terminal, a notebook personal computer (PC), a desktop PC, a mobile phone, or a personal digital assistant (PDA).

[1-3. Configuration of an Information Processing Device According to the Embodiment]

Figure 3:
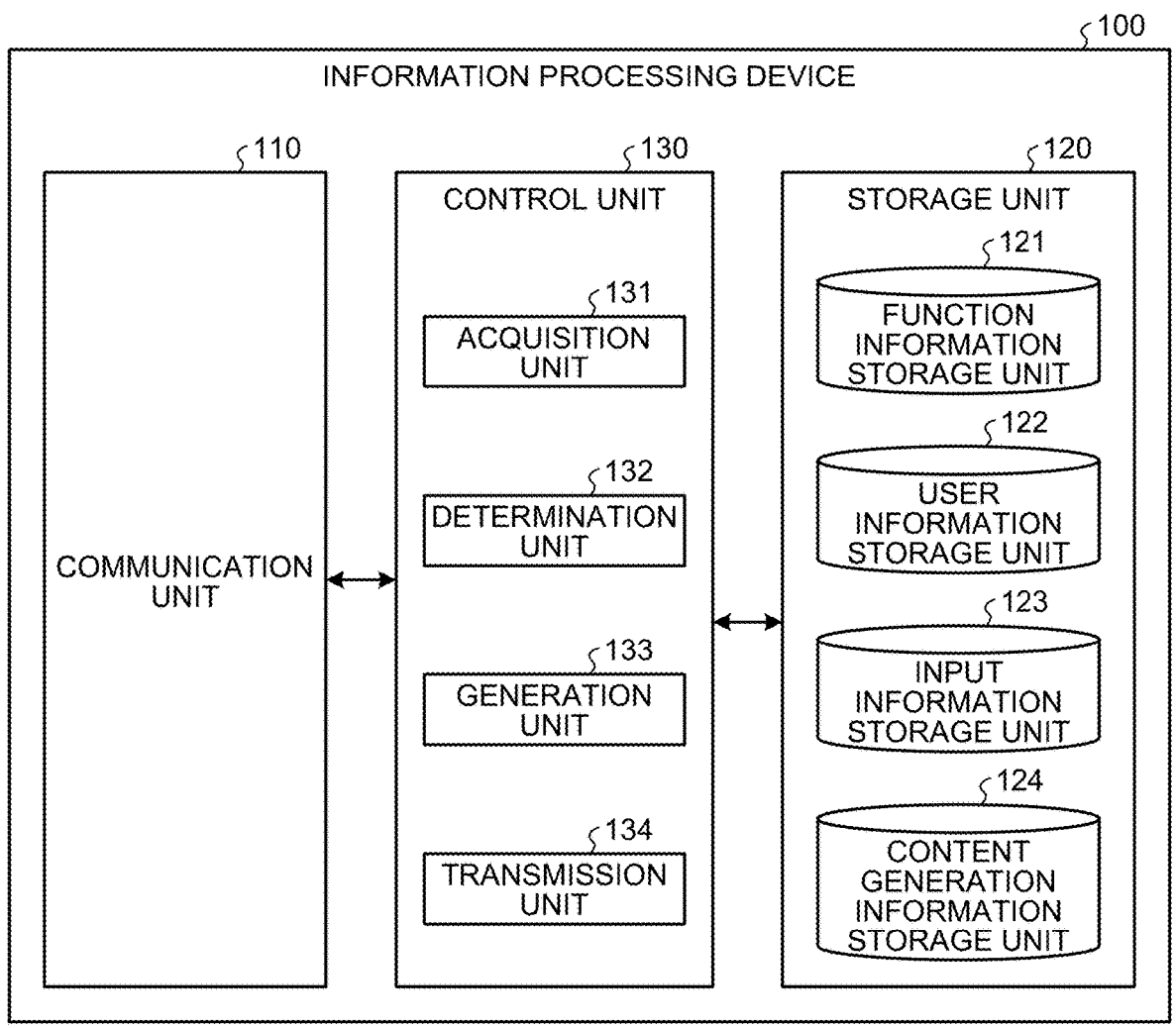
FIG. 3 is a view illustrating a configuration example of an information processing device according to the embodiment of the present disclosure.

Next, a configuration of the information processing device 100, which is an example of the information processing device that executes the information processing according to the embodiment, will be described. FIG. 3 is a view illustrating a configuration example of the information processing device 100 according to the embodiment of the present disclosure.

As illustrated in FIG. 3, the information processing device 100 includes a communication unit 110, a storage unit 120, and a control unit 130. Note that the information processing device 100 may include an input unit (such as keyboard or mouse) that receives various kinds of operation from an administrator or the like of the information processing device 100, and a display unit (such as liquid-crystal display) to display various kinds of information.

The communication unit 110 is realized, for example, by a network interface card (NIC) or the like. Then, the communication unit 110 is connected to the network N (see FIG. 2) in a wired or wireless manner, and transmits and receives information to and from another information processing device such as the terminal device 10 or the speech recognition server. Furthermore, the communication unit 110 may transmit and receive information to and from a user terminal (not illustrated) used by the user.

The storage unit 120 is realized by a semiconductor memory element such as a random access memory (RAM) or a flash memory, or a storage device such as a hard disk or an optical disk, for example. As illustrated in FIG. 3, the storage unit 120 according to the embodiment includes a function information storage unit 121, a user information storage unit 122, an input information storage unit 123, and a content generation information storage unit 124.

Figures 4, 5:
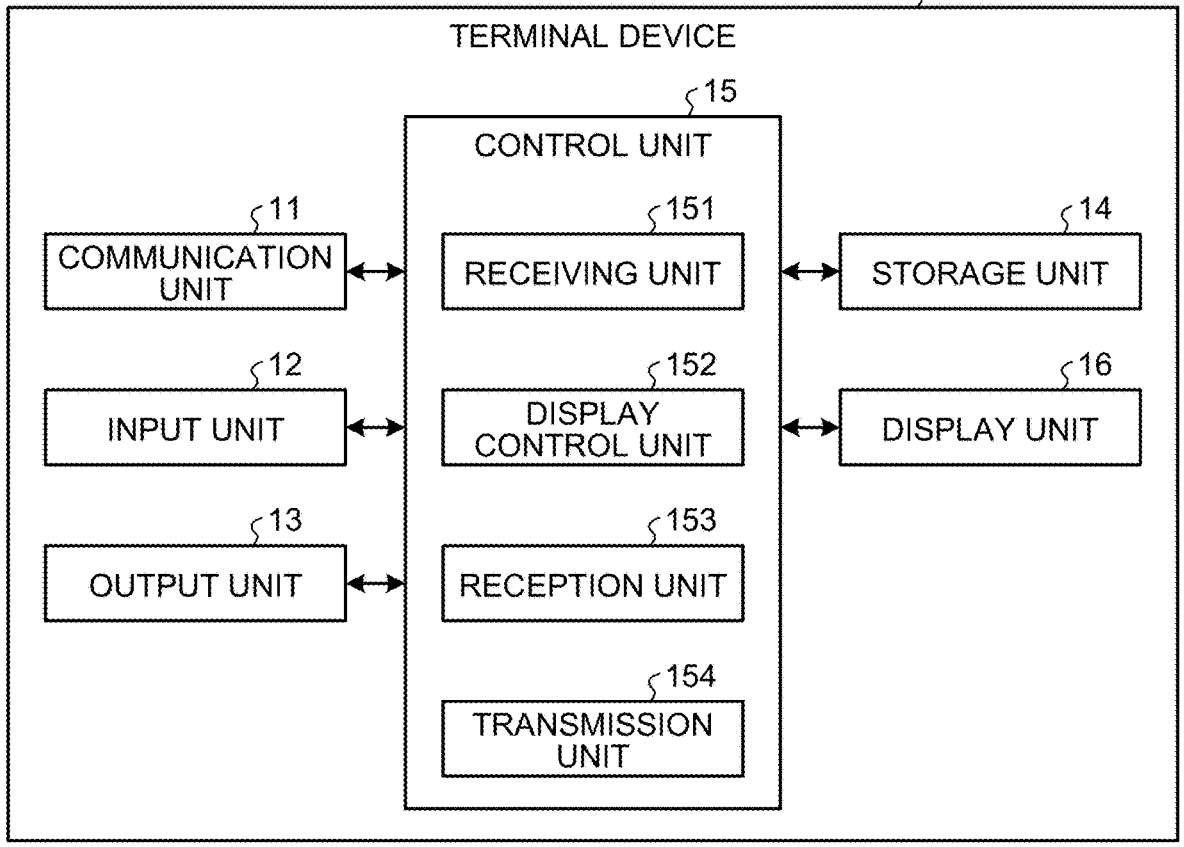
FIG. 4 is a view illustrating an example of a function information storage unit according to the embodiment of the present disclosure.
FIG. 5 is a view illustrating a configuration example of a terminal device according to the embodiment of the present disclosure.

The function information storage unit 121 according to the embodiment stores various kinds of information related to a function. The function information storage unit 121 stores information related to each function executed in response to the input by the user. FIG. 4 is a view illustrating an example of the function information storage unit according to the embodiment. The function information storage unit 121 illustrated in FIG. 4 includes items such as a "function", an "input item (essential)", and an "input item (optional)". Furthermore, in the example of FIG. 4, field blue where the "input item (essential)" includes items such as "#1" and "#2", and the "input item (optional)" includes an item such as "#1" is illustrated. Note that the "input item (essential)" and the "input item (optional)" are not limited to "#1" and "#2" and may include items such as "#3" and "#4" the number of which items corresponds to that of input items.

The "function" indicates a function. The "function" indicates a name of the function. Note that identification information (such as function ID) for identifying each function may be stored in the "function". The "input item (essential)" indicates, among input items of a corresponding function, an input item essential for execution of the function. The "input item (optional)" indicates, among the input items of the corresponding function, an optional input item that is not essential for execution of the function. Note that the data structure illustrated in FIG. 4 is an example, and it may be managed by a flag or the like whether each input item is essential or optional.

It is indicated in the example of FIG. 4 that the function "Invitation" includes "Game" and "Friend" as essential input items. In addition, it is indicated that the function "Invitation" includes "Message" as an optional input item.

In addition, it is indicated that the function "Message" includes "Friend" and "Message" as essential input items. In addition, it is indicated that the function "Message" includes "-" as an optional input item, that is, includes no optional input item.

Note that the function information storage unit 121 may store not only the above but also various kinds of information depending on a purpose.

The user information storage unit 122 according to the embodiment stores various kinds of information related to a user. For example, the user information storage unit 122 stores various kinds of information such as attribute information of each user. The user information storage unit 122 stores information related to the user, such as a user ID, an age, a gender, and a residential place. The user information storage unit 122 stores information for identifying a device (such as television or smartphone) used by each user in association with the user. The user information storage unit 122 stores information for identifying the terminal device 10 used by each user (such as terminal ID) in association with the user.

The user information storage unit 122 stores information indicating a relationship of each user (relationship information). For example, the user information storage unit 122 stores relationship information indicating whether each user has friendship. The user information storage unit 122 stores, in association with each user, a list of user IDs of users having the friendship with the user.

Furthermore, the user information storage unit 122 stores information related to a situation of each user (status information). For example, the user information storage unit 122 stores the status information indicating whether each user is online or offline. The user information storage unit 122 stores, in association with each user, the status information indicating whether a state is any of a first state in which the user is online on a first device, a second state in which the user is online on a second device other than the first device, or a third state in which the user is offline. For example, the user information storage unit 122 stores, in association with each user, the status information indicating whether the state is the first state in which the user is online on the terminal device 10 that is the first device, the second state in which the user is online on a device such as a smartphone of the user which device is the second device other than the terminal device 10, or the third state. For example, the user information storage unit 122 stores, in association with each user, the status information indicating whether the state is the first state in which the user is online on the first device (such as television) that can execute the function "Game", the second state in which the user is online on the second device that cannot execute the function "Game", or the third state.

Note that the user information storage unit 122 may store not only the above but also various kinds of information depending on a purpose. For example, the user information storage unit 122 may store not only the age and gender but also other demographic attribute information and psychographic attribute information. For example, the user information storage unit 122 may store information such as a name, home, place of work, interest, family structure, income, and lifestyle.

The input information storage unit 123 according to the embodiment stores various kinds of information related to the input by the user. For example, the input information storage unit 123 stores the input information that is input by utilization of the terminal device 10 of each user. For example, the input information storage unit 123 stores input information input by voice or input information input by operation on the terminal device 10 by the user. For example, the input information storage unit 123 stores, in association with each piece of input information, identification information for identifying the input information (input information ID) and a date and time when the input is performed. Note that the input information storage unit 123 may store not only the above but also various kinds of information depending on a purpose.

The content generation information storage unit 124 according to the embodiment stores various kinds of information used for generation of content. For example, the content generation information storage unit 124 stores information used for generation of content displayed on a display device such as the terminal device 10. For example, the content generation information storage unit 124 stores image information used for generation of content. For example, as the image information used for generation of content, the content generation information storage unit 124 may store images in various formats such as the Joint Photographic Experts Group (JPEG), Graphics Interchange Format (GIF), and Portable Network Graphics (PNG). Furthermore, the content generation information storage unit 124 may store information in a format of Cascading Style Sheets (CSS), JavaScript (registered trademark), or HyperText Markup Language (HTML) as the image information used for generation of content. Note that the content generation information storage unit 124 may store not only the above but also various kinds of information depending on a purpose.

Returning to FIG. 3, the description is continued. The control unit 130 is realized, for example, when a program (such as information processing program according to the present disclosure) stored in the information processing device 100 is executed by a central processing unit (CPU), a micro processing unit (MPU), or the like with a random access memory (RAM) or the like as a work area. Also, the control unit 130 is realized by, for example, an integrated circuit such as an application specific integrated circuit (ASIC) or a field programmable gate array (FPGA).

As illustrated in FIG. 3, the control unit 130 includes an acquisition unit 131, a determination unit 132, a generation unit 133, and a transmission unit 134, and realizes or executes a function and an action of information processing described below. Note that an internal configuration of the control unit 130 is not limited to the configuration illustrated in FIG. 3, and may be another configuration as long as being a configuration of performing the information processing described later. Also, a connection relationship of each processing unit included in the control unit 130 is not limited to the connection relationship illustrated in FIG. 3, and may be another connection relationship.

The acquisition unit 131 acquires various kinds of information. The acquisition unit 131 acquires the various kinds of information from an external information processing device. The acquisition unit 131 acquires the various kinds of information from the terminal device 10. The acquisition unit 131 acquires the various kinds of information from another information processing device such as the speech recognition server.

The acquisition unit 131 acquires the various kinds of information from the storage unit 120. The acquisition unit 131 acquires the various kinds of information from the function information storage unit 121, the user information storage unit 122, the input information storage unit 123, and the content generation information storage unit 124.

The acquisition unit 131 acquires various kinds of information generated by the generation unit 133. The acquisition unit 131 acquires various kinds of information generated by the generation unit 133. The acquisition unit 131 acquires various kinds of information determined by the determination unit 132.

The acquisition unit 131 acquires, from the terminal device 10, the input information input to the terminal device 10 by the user. The acquisition unit 131 acquires input information input to the terminal device 10 by the voice by the user. The acquisition unit 131 acquires input information input to the terminal device 10 by the operation by the user.

For example, the acquisition unit 131 acquires the input information IN1 from the terminal device 10. The acquisition unit 131 acquires, from the terminal device 10, the input information indicating that the user U1 performs the operation of selecting John and Bob. The acquisition unit 131 acquires the input information IN2 from the terminal device 10.

The determination unit 132 determines various kinds of information. The determination unit 132 makes various kinds of determination. The determination unit 132 judges the various kinds of information. For example, the determination unit 132 determines the various kinds of information on the basis of the information from the external information processing device or the information stored in the storage unit 120. The determination unit 132 determines the various kinds of information on the basis of the information from another information processing device such as the terminal device 10 or the speech recognition server. The determination unit 132 determines the various kinds of information on the basis of the information stored in the function information storage unit 121, the user information storage unit 122, the input information storage unit 123, or the content generation information storage unit 124. The determination unit 132 extracts the various kinds of information. For example, the determination unit 132 extracts the various kinds of information on the basis of the information from the external information processing device or the information stored in the storage unit 120.

The determination unit 132 determines the various kinds of information on the basis of the various kinds of information acquired by the acquisition unit 131. The determination unit 132 determines the various kinds of information on the basis of the various kinds of information generated by the generation unit 133. The determination unit 132 makes various kinds of determination on the basis of the determination. The various kinds of determination are made on the basis of the information acquired by the acquisition unit 131. The determination unit 132 judges whether there is a function in which an essential input item is input.

For example, the determination unit 132 estimates the intent of the input information IN1 by the function of natural language understanding. The determination unit 132 estimates the intent of the input information IN1 by using technologies of natural language understanding, entity analysis, and the like.

For example, the determination unit 132 extracts information of a user having a friendship with the user U1 among users stored in the user information storage unit 122. From among the plurality of functions stored in the function information storage unit 121, the determination unit 132 extracts a function including a corresponding input item as an input item. The determination unit 132 extracts the function "Invitation", the function "Message", the function "VoiceChat", and the like as functions including the input item "Friend".

For example, the determination unit 132 determines to set "ActionG" as the parameter of the input item "Game". The determination unit 132 specifies that the corresponding input item corresponding to the input by the user U1 is the input item "Game" on the basis of the input information IN2. The determination unit 132 sets "ActionG" as the parameter of the input item "Game". The determination unit 132 determines the function "Invitation" as an execution candidate function.

The generation unit 133 generates various kinds of information. The generation unit 133 generates the various kinds of information on the basis of the information from the external information processing device or the information stored in the storage unit 120. The generation unit 133 generates the various kinds of information on the basis of the information from another information processing device such as the terminal device 10 or the speech recognition server. The generation unit 133 generates the various kinds of information on the basis of the information stored in the function information storage unit 121, the user information storage unit 122, the input information storage unit 123, or the content generation information storage unit 124.

The generation unit 133 generates the various kinds of information on the basis of the various kinds of information acquired by the acquisition unit 131. The generation unit 133 generates the various kinds of information on the basis of the various kinds of information determined by the determination unit 132.

The generation unit 133 generates content of displaying an input item of each function including a corresponding input item that is an input item corresponding to the input information. The generation unit 133 generates content of displaying a union of input items of the functions. In a case where a first input item of a first function including the corresponding input item and a second input item of a second function including the corresponding input item are common, the generation unit 133 generates content of displaying the input items of the functions with the first input item and the second input item as one input item.

The generation unit 133 generates content of displaying a parameter corresponding to the corresponding input item based on the input information together with the corresponding input item. The generation unit 133 generates content of displaying each function together with an input item of each function. The generation unit 133 generates content of displaying the corresponding input item in a manner of being distinguishable from the other input items. The generation unit 133 generates a dialog box into which the parameter corresponding to the corresponding input item is input.

By appropriately using various technologies, the generation unit 133 generates various kinds of information such as a screen (image information) provided to the external information processing device. The generation unit 133 generates a screen (image information) or the like provided to the terminal device 10. For example, on the basis of the information stored in the storage unit 120, the generation unit 133 generates the screen (image information) or the like provided to the terminal device 10. In the example of FIG. 1, the generation unit 133 generates the content CT11. The generation unit 133 may generate the screen (image information) or the like by any kind of processing as long as the screen (image information) or the like provided to the external information processing device can be generated. For example, the generation unit 133 generates the screen (image information) provided to the terminal device 10 by appropriately using various technologies related to image generation, image processing, and the like. For example, by appropriately using various technologies such as Java (registered trademark), the generation unit 133 generates the screen (image information) provided to the terminal device 10. Note that the generation unit 133 may generate the screen (image information) provided to the terminal device 10 on the basis of the format of CSS, JavaScript (registered trademark), or HTML. Furthermore, for example, the generation unit 133 may generate the screen (image information) in various formats such as Joint Photographic Experts Group (JPEG), Graphics Interchange Format (GIF), and Portable Network Graphics (PNG).

For example, the generation unit 133 acquires status information of users (friend user) having friendship with the user U1 from the user information storage unit 122, and generates content CT1 indicating status of the friend users. The generation unit 133 generates the content CT1 distinguishably indicating a user in the first state with a white circle, a user in the second state with an icon of a smartphone, and a user in the third state with a black circle. The generation unit 133 generates the content CT1 that displays that John and Bob among the friend users of the user U1 are in the first state, displays that Jonny is in the second state, and displays that Bobby is in the third state. The generation unit 133 generates the content CT11 and the content 0112. The generation unit 133 generates the content CT11 that displays the input item of each function including the input item "Friend" that is the corresponding input item corresponding to the input information of the user U1. The generation unit 133 generates the content CT12 that displays the input item of each function including the input item "Game" that is the corresponding input item corresponding to the input information IN2.

The transmission unit 134 provides various kinds of information to the external information processing device. The transmission unit 134 transmits various kinds of information to the external information processing device. For example, the transmission unit 134 transmits the various kinds of information to another information processing device such as the terminal device 10 or the speech recognition server. The transmission unit 134 provides the information stored in the storage unit 120. The transmission unit 134 transmits the information stored in the storage unit 120.

The transmission unit 134 provides the various kinds of information on the basis of the information from another information processing device such as the terminal device 10 or the speech recognition server. The transmission unit 134 provides the various kinds of information on the basis of the information stored in the storage unit 120. The transmission unit 134 provides the various kinds of information on the basis of the information stored in the function information storage unit 121, the user information storage unit 122, the input information storage unit 123, or the content generation information storage unit 124.

The transmission unit 134 transmits the content generated by the generation unit 133 to the terminal device 10. The transmission unit 134 transmits the dialog box generated by the generation unit 133 to the terminal device 10. For example, the transmission unit 134 transmits the content CT1, the content CT11, and the content CT12 to the terminal device 10. The transmission unit 134 transmits information indicating that the execution candidate function is the function "Invitation" to the terminal device 10.

[1-4. Configuration of a Terminal Device According to the Embodiment]

Next, a configuration of the terminal device 10, which is an example of the information processing device that executes the information processing according to the embodiment, will be described. FIG. 5 is a view illustrating a configuration example of the terminal device according to the embodiment of the present disclosure.

As illustrated in FIG. 5, the terminal device 10 includes a communication unit 11, an input unit 12, an output unit 13, a storage unit 14, a control unit 15, and a display unit 16.

The communication unit 11 is realized, for example, by an NIC, a communication circuit, or the like. The communication unit 11 is connected to a network N (such as the Internet) in a wired or wireless manner, and transmits and receives information to and from another device such as the information processing device 100 via the network N.

Various kinds of operation are input from the user to the input unit 12. The input unit 12 has a function of detecting voice. The input unit 12 has a microphone (sound sensor) that detects the voice. The input unit 12 receives voice of the speech by the user as input information.

Furthermore, the input unit 12 may receive, as an operation input by the user, operation on the terminal device 10 used by the user (user operation). For example, the input unit 12 may receive the user operation on the terminal device 10 as the operation input by the user via the communication unit 11. For example, the input unit 12 may include a remote controller (remote controller) or the like separate from the terminal device 10. For example, the input unit 12 may receive information from the remote controller, which information corresponds to the user operation, by various methods such as infrared communication or predetermined wireless communication. In this case, for example, the input unit 12 may receive information related to the operation using the remote controller by the user via the communication unit 11. Furthermore, the input unit 12 may include a button provided on the terminal device 10, or a keyboard or a mouse connected to the terminal device 10.

For example, the input unit 12 may include a touch panel capable of realizing functions equivalent to those of the remote controller, keyboard, and mouse. In this case, various kinds of information are input to the input unit 12 via the display unit 16. The input unit 12 receives various kinds of operation from the user via the display screen by a function of the touch panel realized by various sensors. That is, the input unit 12 receives various kinds of operation from the user via the display unit 16 of the terminal device 10. For example, the input unit 12 receives operation such as designation operation by the user via the display unit 16 of the terminal device 10. For example, the input unit 12 functions as a reception unit that receives the operation by the user by the function of the touch panel. In this case, the input unit 12 and the reception unit 153 may be integrated. Note that a capacitive sensing method is mainly employed in a tablet terminal as a method of detecting the operation by the user by the input unit 12. However, any method such as a resistive film method, a surface acoustic wave method, an infrared method, or an electromagnetic resonance method that is another detection method may be employed as long as the operation by the user can be detected and the function of the touch panel can be realized.

For example, the input unit 12 detects the speech "John and Bob" by the user U1. The input unit 12 detects the speech "Change game to ActionG" by the user U1.

The output unit 13 outputs various kinds of information. The output unit 13 has a function of outputting sound. For example, the output unit 13 includes a speaker that outputs the sound. The output unit 13 outputs information to the user by the sound. The output unit 13 outputs, by the sound, the information displayed on the display unit 16. For example, the output unit 13 outputs, by the sound, information included in content. For example, the output unit 13 outputs the output information OT1 such as "Send this invitation?" by the sound.

The storage unit 14 is realized, for example, by a semiconductor memory element such as a RAM or a flash memory, or a storage device such as a hard disk or an optical disk. The storage unit 14 stores various kinds of information used for displaying of the information.

Returning to FIG. 5, the description is continued. The control unit 15 is realized, for example, when a program (for example, display program such as the information processing program according to the present disclosure) stored in the terminal device 10 is executed by the CPU, MPU, or the like with the RAM or the like as a work area. Also, the control unit 15 may be realized by, for example, an integrated circuit such as an ASIC or an FPGA.

As illustrated in FIG. 5, the control unit 15 includes a receiving unit 151, a display control unit 152, a reception unit 153, and a transmission unit 154, and realizes or executes a function and an action of information processing described below. Note that an internal configuration of the control unit 15 is not limited to the configuration illustrated in FIG. 5, and may be another configuration as long as being a configuration of performing information processing described later.

The receiving unit 151 receives various kinds of information. The receiving unit 151 receives the various kinds of information from the external information processing device. The receiving unit 151 receives the various kinds of information from another information processing device such as the information processing device 100 or the speech recognition server.

The receiving unit 151 receives, from the information processing device 100, the content of displaying the input item of each function including the corresponding input item that is the input item corresponding to the input information. The receiving unit 151 receives the content of displaying a union of input items of the functions. In a case where the first input item of the first function including the corresponding input item and the second input item of the second function including the corresponding input item are common, the receiving unit 151 receives the content of displaying the input items of the functions with the first input item and the second input item as one input item.

The receiving unit 151 receives the content of displaying the parameter corresponding to the corresponding input item based on the input information together with the corresponding input item. The receiving unit 151 receives the content of displaying each function together with an input item of each function. The receiving unit 151 receives the content of displaying the corresponding input item in a manner of being distinguishable from the other input items. The receiving unit 151 receives the dialog box into which the parameter corresponding to the corresponding input item is input. For example, the receiving unit 151 receives the content CT1, the content CT11, and the content CT12 from the information processing device 100.

The display control unit 152 controls various kinds of display. The display control unit 152 controls display on the display unit 16. The display control unit 152 controls the display on the display unit 16 according to the reception by the receiving unit 151. The display control unit 152 controls the display on the display unit 16 on the basis of the information received by the receiving unit 151. The display control unit 152 controls the display on the display unit 16 on the basis of the information received by the reception unit 153. The display control unit 152 controls the display on the display unit 16 according to the reception by the reception unit 153. The display control unit 152 controls the display on the display unit 16 in such a manner that the content CT11 is displayed on the display unit 16. For example, the display control unit 152 controls the display on the display unit 16 in such a manner that the content CT1, the content CT11, and the content CT12 are displayed.

The reception unit 153 receives various kinds of information. The reception unit 153 receives an input by the user via the input unit 12. The reception unit 153 receives speech by the user as the input. The reception unit 153 receives operation by the user. The reception unit 153 receives the operation by the user on the information displayed by the display unit 16. The reception unit 153 receives a character input by the user.

For example, the reception unit 153 receives the character information "John and Bob" as the input information IN1. The reception unit 153 receives the character information "Change game to ActionG" as the input information IN2.

The transmission unit 154 transmits various kinds of information to the external information processing device. For example, the transmission unit 154 transmits the various kinds of information to another information processing device such as the terminal device 10 or the speech recognition server. The transmission unit 154 transmits the information stored in the storage unit 14.

The transmission unit 154 transmits the various kinds of information on the basis of the information from another information processing device such as the information processing device 100 or the speech recognition server. The transmission unit 154 transmits the various kinds of information on the basis of the information stored in the storage unit 14.

The transmission unit 154 transmits the input information input by the user to the information processing device 100. The transmission unit 154 transmits the input information input by the voice by the user to the information processing device 100. The transmission unit 154 transmits the input information input by the operation by the user to the information processing device 100.

For example, the transmission unit 154 transmits the input information IN1 to the information processing device 100. The transmission unit 154 transmits, as the input information, information indicating that the user U1 performs the operation of selecting John and Bob to the information processing device 100. The transmission unit 154 transmits the input information IN2 to the information processing device 100.

The display unit 16 is provided in the terminal device 10 and displays various kinds of information. The display unit 16 is realized by, for example, a liquid crystal display, an organic electro-luminescence (EL) display, or the like. The display unit 16 may be realized by any means as long as the information provided from the information processing device 100 can be displayed. The display unit 16 displays the various kinds of information under the control of the display control unit 152.

The display unit 16 displays the input item of each function including the corresponding input item by displaying the content received by the receiving unit 151. The display unit 16 displays the union of input items of the functions. The display unit 16 displays the input items of the functions with the first input item and the second input item as one input item. The display unit 16 displays the parameter together with the corresponding input item. The display unit 16 displays each function together with the input items of each function. The display unit 16 displays the corresponding input item in a manner of being distinguishable from the other input items. The display unit 16 displays the dialog box received by the receiving unit 151. For example, the display unit 16 displays the content CT1, the content CT11, and the content CT12. The display unit 16 displays the output information OT1 such as "Send this invitation?".

[1-5. Procedure of the Information Processing According to the Embodiment]

Next, procedures of various kinds of information processing according to the embodiment will be described with reference to FIG. 6 to FIG. 8.

[1-5-1. Procedure of Processing Related to the Information Processing Device]

First, a flow of the processing related to the information processing device according to the embodiment of the present disclosure will be described with reference to FIG. 6. FIG. 6 is a flowchart illustrating a processing procedure of the information processing device according to the embodiment of the present disclosure. Specifically, FIG. 6 is a flowchart illustrating the procedure of the information processing by the information processing device 100.

As illustrated in FIG. 6, the information processing device 100 acquires, from the terminal device 10, the input information input to the terminal device 10 by the user (Step S101). Then, the information processing device 100 generates the content of displaying the input item of each function including the corresponding input item that is the input item corresponding to the input information (Step S102). Then, the information processing device 100 transmits the content to the terminal device 10 (Step S103).

[1-5-2. Procedure of Processing Related to the Display Device]

Next, a flow of the information processing according to the embodiment of the present disclosure will be described with reference to FIG. 7. FIG. 7 is a flowchart illustrating a processing procedure of the display device according to the embodiment of the present disclosure. Specifically, FIG. 7 is a flowchart illustrating a procedure of display processing by the terminal device 10 that is an example of the display device.

As illustrated in FIG. 7, the terminal device 10 transmits the input information input by the user to the server device (Step S201). For example, the terminal device 10 transmits the input information input by the user to the information processing device 100 that is a server device.

The terminal device 10 receives, from the server device, the content of displaying the input item of each function including the corresponding input item that is the input item corresponding to the input information (Step S202). For example, the terminal device 10 receives, from the information processing device 100 that is the server device, the content of displaying the input item of each function including the corresponding input item that is the input item corresponding to the input information.

By displaying the received content, the terminal device 10 displays the input item of each function including the corresponding input item (Step S203).

[1-5-3. Procedure of Processing Related to the Information Processing System]

Next, a flow of processing related to the information processing system according to the embodiment of the present disclosure will be described with reference to FIG. 8. FIG. 8 is a sequence diagram illustrating a processing procedure of the information processing system according to the embodiment of the present disclosure.

As illustrated in FIG. 8, the terminal device 10 receives the input by the user (Step S301). For example, the terminal device 10 receives the input by the voice of the user.

Then, the terminal device 10 transmits the input information input by the user to the information processing device 100 (Step S302).

The information processing device 100 generates content on the basis of the input information of the user which information is acquired from the terminal device 10 (Step S303). Then, the information processing device 100 transmits the generated content to the terminal device 10 (Step S304).

Then, the terminal device 10 displays the content received from the information processing device 100 (Step S305).

[1-6. First Display Example of an Input Item with a Low Correction Cost]

Hereinafter, various examples of display of input items of functions corresponding to an input by the user will be described with reference to the drawings. Note that description of points similar to those in FIG. 1 will be omitted as appropriate in the following description.

First, an example of a graphical user interface (GUI) display with a low correction cost in the middle will be described with reference to FIG. 9. FIG. 9 is a view illustrating an example of the display of the input item with the low correction cost.

First, the user U1 who uses the terminal device 10 speaks "John and Bob". The terminal device 10 detects the speech "John and Bob" by the user U1. Then, the terminal device 10 receives character information "John and Bob" as input information IN21 by the function of automatic speech recognition. Then, the terminal device 10 transmits the input information IN21 to the information processing device 100. As a result, the information processing device 100 acquires the input information IN21 from the terminal device 10.

Then, the information processing device 100 estimates intent of the input information IN21 by the function of natural language understanding. The information processing device 100 estimates that the intention of the input information IN21 is an input of the input item "Friend". The information processing device 100 generates content CT21 that displays the input item of each function including the input item "Friend" that is the corresponding input item corresponding to the input information of the user U1 (Step S21). First, the information processing device 100 extracts, from among the functions, the function including the input item "Friend" as the input item. In the example of FIG. 9, the information processing device 100 extracts the function "Invitation", the function "Mail", the function "VoiceChat", and the like as functions including the input item "Friend".

Furthermore, as illustrated in a function information group FD21, the function "Invitation" has the input item "Game" and the input item "Friend" as essential input items, and has the input item "Message" as an optional input item. Note that it is indicated that a function enclosed in parentheses (parentheses) such as (Message) in the function information group FD21 is an optional input item for execution. In addition, as illustrated in the function information group FD21, it is indicated that the function "Mail" includes "Friend" and "Message" as the input items. In addition, as illustrated in the function information group FD21, it is indicated that the function "VoiceChat" includes "Friend" and "Volume" as the input items.

The information processing device 100 sets "John" and "Bob" as parameters of the input item "Friend" that is the corresponding input item, and generates the content CT21. In addition, the information processing device 100 generates the content CT21 that displays a union of the input items of the function "Invitation", the function "Mail", and the function "VoiceChat" including the input item "Friend".

Here, with respect to input items other than the input item "Friend" that is the corresponding input item, the information processing device 100 generates the content CT21 that displays, in association with each function, an input item of the function. In the example of FIG. 9, with respect to input items other than the input item "Friend" that is the corresponding input item, the information processing device 100 generates the content CT21 that displays, in association with each function, an essential input item of the function.

For example, the information processing device 100 generates the content CT21 that displays, next to a character string of the function "Invitation", the input item "Game" that is an essential input item of the function. In addition, the information processing device 100 generates the content CT21 that displays, next to a character string of the function "Mail", the input item "Message" that is an essential input item of the function. In addition, the information processing device 100 generates the content CT21 that displays, next to a character string of the function "VoiceChat", the input item "Volume" that is an essential input item of the function.

As a result, the information processing device 100 generates the content CT21 in which the input item "Friend" for which the parameter is already set is arranged in an upper part and a list of the functions including the input item "Friend" and the essential input items of the functions is arranged below. Note that the information processing device 100 may display an optional input item of the functions. For example, the information processing device 100 may generate content that displays, next to the character string of the function "Invitation", the input item "Game" that is the essential input item of the function and the input item "Message" that is an optional input item of the function. In addition, since there is no executable function, the information processing device 100 generates the content CT21 in which information such as "Action unidentified" indicating that no function is specified is arranged in the upper part.

Then, the information processing device 100 transmits the content CT21 to the terminal device 10. The terminal device 10 displays the content CT21. In such a manner, after the parameter setting for the input item "Friend", the terminal device 10 can present, to the user U1, the input item necessary for executing each of the functions including the input item "Friend". As a result, the user U1 can recognize which input item is necessary to execute each of the functions including the input item "Friend" after the parameter setting for the input item "Friend". Thus, the user U1 can easily perform the input after the parameter setting for the input item "Friend".

Then, the user U1 who checks the content CT21 speaks "Change game to ActionG". The terminal device 10 detects the speech "Change game to ActionG" by the user U1. Then, the terminal device 10 receives character information "Change game to ActionG" as input information IN22 by the function of automatic speech recognition. Then, the terminal device 10 transmits the input information IN22 to the information processing device 100. As a result, the information processing device 100 acquires the input information IN22 from the terminal device 10.

Then, the information processing device 100 estimates intent of the input information IN22 by the function of natural language understanding. By the function of natural language understanding, the information processing device 100 estimates that the intent of the input information IN22 is to designate "ActionG" as the parameter of the input item "Game". Thus, the information processing device 100 determines to set "ActionG" as the parameter of the input item "Game".

The information processing device 100 generates content CT22 in which the parameter "ActionG" is set for the input item "Game" that is the input item corresponding to the input information IN22 (Step S22). Then, the information processing device 100 determines a function to be a candidate of execution (execution candidate function). In the example of FIG. 9, the information processing device 100 determines the function "Invitation" as the execution candidate function. The information processing device 100 generates the content CT22 in which information indicating that the function "Invitation" is executable is arranged in an upper part.

Here, the information processing device 100 generates the content CT22 that also displays a list of the other functions "Mail" and "VoiceChat" together with the function "Invitation" determined to be the execution candidate function. For example, the information processing device 100 generates the content CT22 that distinguishably displays information of the function "Invitation" and information related to the functions other than the function "Invitation". In the example of FIG. 9, the information processing device 100 displays the information of the function "Invitation" and the other information distinguishably by lightening a color of the information of the function "Mail" and the function "VoiceChat" that are other than the function "Invitation". The information processing device 100 generates the content CT22 in which the colors of the function "Mail", the input item "Message" thereof, the function "VoiceChat", and the input item "Volume" thereof are lightened. As a result, the information processing device 100 can generate the content of distinguishably displaying the execution candidate function while displaying the list of the plurality of functions.

Then, the information processing device 100 transmits the content CT22 to the terminal device 10. The terminal device 10 displays the content CT22. As a result, the user U1 can recognize that the setting of the parameters for the input item "Friend" and the input item "Game" is completed and that the function "Invitation" is executable.

Then, the user U1 who checks the content CT22 speaks "Change volume to 20". The terminal device 10 detects the speech "Change volume to 20" by the user U1. Then, the terminal device 10 receives character information "Change volume to 20" as input information IN23 by the function of automatic speech recognition. Then, the terminal device 10 transmits the input information IN23 to the information processing device 100. As a result, the information processing device 100 acquires the input information IN23 from the terminal device 10.

Then, the information processing device 100 estimates intent of the input information IN23 by the function of natural language understanding. By the function of natural language understanding, the information processing device 100 estimates that the intent of the input information IN23 is to designate "20" as the parameter of the input item "Volume". Thus, the information processing device 100 determines to set "20" as the parameter of the input item "Volume".

The information processing device 100 generates content CT23 in which the parameter "20" is set for the input item "Volume" that is the input item corresponding to the input information IN23 (Step S23). Then, the information processing device 100 determines a function to be a candidate of execution (execution candidate function). For example, in a case where there is a plurality of executable functions, the information processing device 100 determines, as an execution candidate function, a function corresponding to the latest input by the user. In the example of FIG. 9, the information processing device 100 changes the execution candidate function from the function "Invitation" to the function "VoiceChat". The information processing device 100 determines the function "VoiceChat" as the execution candidate function. The information processing device 100 generates the content CT23 in which information indicating that the function "VoiceChat" is executable is arranged in an upper part.

Here, the information processing device 100 generates the content CT23 that displays a list of the other functions "Invitation" and "Mail" together with the function "VoiceChat" determined to be the execution candidate function. For example, the information processing device 100 displays information of the function "VoiceChat" and the other information distinguishably by lightening a color of information of the function "Invitation" and the function "Mail" that are other than the function "VoiceChat". The information processing device 100 generates the content CT22 in which the colors of the function "Invitation", the input item "Game" thereof, the parameter "ActionG" thereof, the function "Mail", and the input item "Message" thereof are lightened. As a result, the information processing device 100 can generate the content of distinguishably displaying the latest execution candidate function while displaying the list of the plurality of functions.

Then, the information processing device 100 transmits the content CT23 to the terminal device 10. The terminal device 10 displays the content CT23. As a result, the user U1 can recognize that the parameter setting for the input item "Friend" and the input item "Volume" is completed and that the function "VoiceChat" is executable. Then, the information processing device 100 executes the function of the function "VoiceChat" (Step S24). For example, the information processing device 100 executes the function "VoiceChat" in response to an instruction to execute the function "VoiceChat" by the user U1.

As described above, since the functions other than the execution candidate function and the input items thereof are kept displayed in the information processing system 1, the user U1 can change the function without returning even in a case of trying to change the function. For example, the information processing system 1 keeps displaying elements of the other functions even when the input by the user progresses and the functions are narrowed down, whereby it is possible to reduce the returning at the time changing of the execution function. That is, the information processing system 1 can realize GUI display with a low correction cost in the middle.

[1-7. Second Display Example of the Input Item with the Low Correction Cost]

Figure 10:
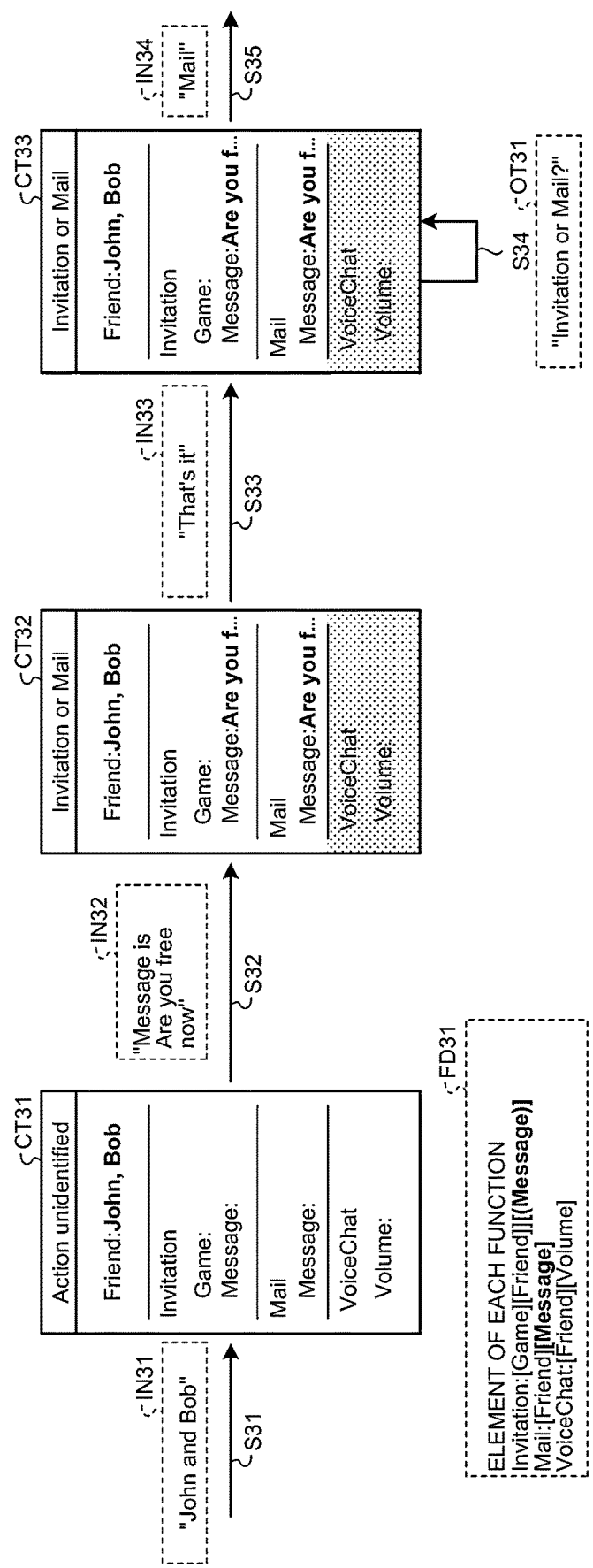
FIG. 10 is a view illustrating another example of the display of the input item with the low correction cost.

Next, another example of the GUI display with the low correction cost in the middle will be described with reference to FIG. 10. FIG. 10 is a view illustrating another example of the display of the input item with the low correction cost. Note that description of points similar to those in FIG. 9 will be omitted as appropriate.

The terminal device 10 transmits character information "John and Bob" based on the speech of the user U1 to the information processing device 100 as input information IN31. As a result, the information processing device 100 acquires the input information IN31 from the terminal device 10.

Then, by the function of natural language understanding, the information processing device 100 estimates that intent of the input information IN31 is the input of the input item "Friend". The information processing device 100 generates content CT31 that displays the input item of each function including the input item "Friend" that is the corresponding input item corresponding to the input information of the user U1 (Step S31). The information processing device 100 extracts the function "Invitation", the function "Mail", the function "VoiceChat", and the like as the functions including the input item "Friend". A function information group FD31 indicates input items of each function similarly to the function information group FD21 in FIG. 9.

The information processing device 100 sets "John" and "Bob" as parameters of the input item "Friend" that is the corresponding input item, and generates the content CT31. In addition, the information processing device 100 generates the content CT31 that displays a union of the input items of the function "Invitation", the function "Mail", and the function "VoiceChat" including the input item "Friend".

Here, with respect to input items other than the input item "Friend" that is the corresponding input item, the information processing device 100 generates the content CT31 that displays, in association with each function, an input item of the function. In the example of FIG. 10, with respect to the input items other than the input item "Friend" that is the corresponding input item, the information processing device 100 generates the content CT31 that displays, in association with each function, an input item of the function.

For example, the information processing device 100 generates the content CT31 that displays, next to a character string of the function "Invitation", the input item "Game" and the input item "Message" that are input items of the function. In addition, the information processing device 100 generates the content CT31 that displays, next to a character string of the function "Mail", the input item "Message" that is the input item of the function. In addition, the information processing device 100 generates the content CT31 that displays, next to a character string of the function "VoiceChat", the input item "Volume" that is the input item of the function. In addition, since there is no executable function, the information processing device 100 generates the content CT31 in which information such as "Action unidentified" indicating that no function is specified is arranged in an upper part.

Then, the information processing device 100 transmits the content CT31 to the terminal device 10. The terminal device 10 displays the content CT31. In such a manner, after the parameter setting for the input item "Friend", the terminal device 10 can present, to the user U1, the input item necessary for executing each of the functions including the input item "Friend". As a result, the user U1 can recognize which input item is necessary to execute each of the functions including the input item "Friend" after the parameter setting for the input item "Friend". Thus, the user U1 can easily perform the input after the parameter setting for the input item "Friend".

Then, the user U1 who checks the content CT31 speaks "Message is Are you free now". The terminal device 10 detects the speech "Message is Are you free now" by the user U1. Then, the terminal device 10 receives character information "Message is Are you free now" as input information IN32 by the function of automatic speech recognition. Then, the terminal device 10 transmits the input information IN32 to the information processing device 100. As a result, the information processing device 100 acquires the input information IN32 from the terminal device 10.

Then, the information processing device 100 estimates intent of the input information IN32 by the function of natural language understanding. By the function of natural language understanding, the information processing device 100 estimates that the intent of the input information IN32 is to designate "Are you free now" as the parameter of the input item "Message". Thus, the information processing device 100 determines to set "Are you free now" as the parameter of the input item "Message".

The information processing device 100 generates content CT32 in which the parameter "Are you free now" is set for the input item "Message" that is the input item corresponding to the input information IN32 (Step S32). The information processing device 100 generates the content CT32 in which the parameter "Are you free now" is set for each of the input item "Message" of the function "Invitation" and the input item "Message" of the function "Mail". Furthermore, the information processing device 100 generates the content CT32 in which information such as "Invitation or Mail" indicating that the functions including the input items for which the parameters are set are the function "Invitation" and the function "Mail" is arranged in an upper part.

Here, the information processing device 100 generates the content CT32 that displays the other function "VoiceChat" in a list together with the function "Invitation" and the function "Mail" in input items of which the parameters are set. For example, the information processing device 100 generates the content CT32 that distinguishably displays information of the function, in the input item of which the parameter is set, and information related to the other functions. In the example of FIG. 10, the information processing device 100 displays the information of the function in the input item of which the parameter is set and the other information distinguishably by lightening a color of the information of the function "VoiceChat". The information processing device 100 generates the content CT32 in which the colors of the function "VoiceChat" and the input item "Volume" thereof are lightened. As a result, the information processing device 100 can generate the content of distinguishably displaying the execution candidate function while displaying the list of the plurality of functions.

Then, the information processing device 100 transmits the content CT32 to the terminal device 10. The terminal device 10 displays the content CT32. As a result, the user U1 can recognize that the parameter setting for the input item "Friend" and the input item "Message" is completed. In such a manner, in the information processing system 1, corresponding functions are narrowed down according to the input by the user.

Then, the user U1 who checks the content CT32 speaks "That's it". The terminal device 10 detects the speech "That's it" by the user U1. Then, by the function of automatic speech recognition, the terminal device 10 receives character information "That's it" as input information IN33. Then, the terminal device 10 transmits the input information IN33 to the information processing device 100.

As a result, the information processing device 100 acquires the input information IN33 from the terminal device 10.

Then, the information processing device 100 estimates intent of the input information IN33 by the function of natural language understanding. By the function of natural language understanding, the information processing device 100 estimates that the intent of the input information IN33 is to end the input of the parameter. Thus, the information processing device 100 ends the reception of the parameter input and determines to check execution of the function with the user (Step S33).

Then, the information processing device 100 transmits, to the terminal device 10, information requesting designation of one of the function "Invitation" and the function "Mail". For example, the information processing device 100 may request the terminal device 10 to designate a function by transmitting information for identifying the function "Invitation" and the function "Mail". The terminal device 10 outputs output information OT31 such as "Invitation or Mail?" (Step S34). Note that the terminal device 10 may output the output information OT31 by sound or may perform display thereof as character information. As a result, the user U1 can check whether the function that he/she wants to execute is the function "Invitation" or the function "Mail", and give an instruction to execute the function.

Then, on the basis of speech "Mail" by the user U1, the terminal device 10 receives character information "Mail" as input information IN34. Then, the terminal device 10 transmits the input information IN34 to the information processing device 100. As a result, the information processing device 100 acquires the input information IN34 from the terminal device 10.

Then, the information processing device 100 estimates intent of the input information IN34 by the function of natural language understanding. The information processing device 100 estimates that the intent of the input information IN34 is execution of the function "Mail" by the function of natural language understanding, and executes the function "Mail" (Step S35).

As described above, even in a case where a plurality of functions has the same element, the information processing system 1 keeps displaying elements of the other functions even when the input by the user progresses and the functions are narrowed down, whereby it is possible to reduce returning at the time of changing the execution function. That is, the information processing system 1 can realize GUI display with a low correction cost in the middle.

[1-8. Example of Compact Display Without Overlapping Display]

Figure 11:
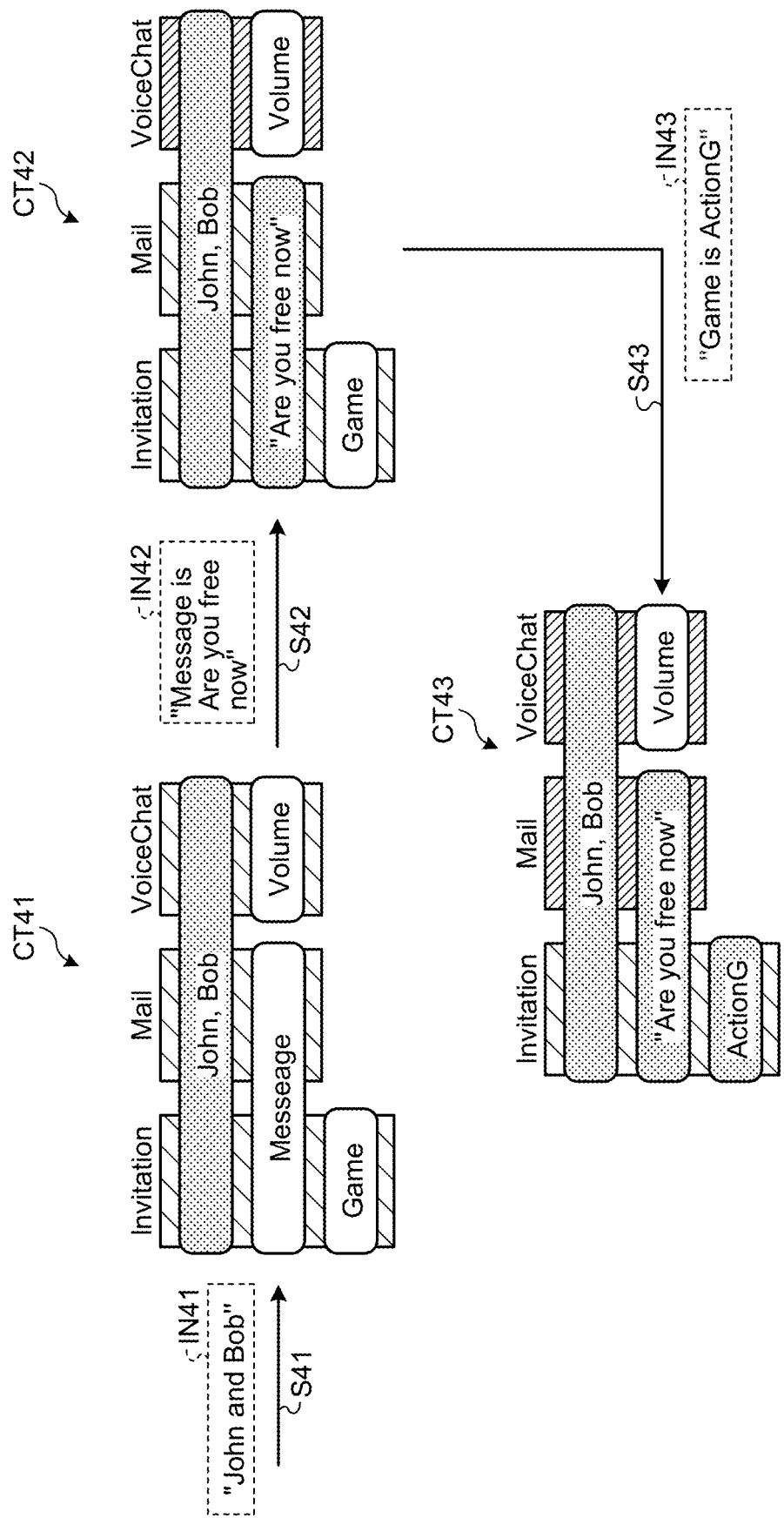
FIG. 11 is a view illustrating an example of a display of overlapping input items.

Next, an example of a case where overlapping display is omitted and compact display is performed will be described with reference to FIG. 11. FIG. 11 is a view illustrating an example of a display of overlapping input items. Note that description of points similar to those in FIG. 9 and FIG. 10 will be omitted as appropriate.

The terminal device 10 transmits character information "John and Bob" based on speech by the user U1 to the information processing device 100 as input information IN41. As a result, the information processing device 100 acquires the input information IN41 from the terminal device 10.

Then, by the function of natural language understanding, the information processing device 100 estimates that intent of the input information IN41 is the input of the input item "Friend". The information processing device 100 generates content CT41 that displays the input item of each function including the input item "Friend" that is the corresponding input item corresponding to the input information of the user U1 (Step S41). The information processing device 100 extracts the function "Invitation", the function "Mail", the function "VoiceChat", and the like as the functions including the input item "Friend".

The information processing device 100 sets "John" and "Bob" as parameters of the input item "Friend" that is the corresponding input item, and generates the content CT41. In addition, the information processing device 100 generates the content CT41 that displays a union of the input items of the function "Invitation", the function "Mail", and the function "VoiceChat" including the input item "Friend".

Here, with respect to input items other than the input item "Friend" that is the corresponding input item, the information processing device 100 generates the content CT41 that displays, in association with each function, an input item of the function. In the example of FIG. 11, the information processing device 100 generates the content CT41 that displays, in association with each function, the input item of each function including the input item "Friend" that is the corresponding input item.

For example, the information processing device 100 generates the content CT41 in which vertically long bars (vertical bars) respectively corresponding to functions are arranged and displayed side by side in a horizontal direction and a horizontally long bar (horizontal bar) corresponding to an input item is superimposed and arranged on the vertical bar of the function including the input item.

For example, the information processing device 100 generates the content CT41 in which the horizontal bar corresponding to the input item "Friend" is arranged in a manner of being superimposed on all of the three vertical bars of the function "Invitation", the function "Mail", and the function "VoiceChat". Furthermore, the information processing device 100 generates the content CT41 in which information indicating that the parameters set for the input item "Friend" are "John" and "Bob" are arranged in the horizontal bar corresponding to the input item "Friend". The information processing device 100 generates the content CT41 that distinguishably displays an input item for which a parameter is already set and an input item for which the parameter is not set. Note that making it possible to distinguish the input item for which the parameter is already set and the input item for which the parameter is not set may be realized by a color of each bar, or may be realized by character information displayed in association with the bar. In the example of FIG. 11, by changing the color of the bar and arranging the set parameter in the bar corresponding to the input item for which the parameter is set, it is made possible to distinguish the input item for which the parameter is already set and the input item for which the parameter is not set.

For example, the information processing device 100 generates the content CT41 in which the horizontal bar corresponding to the input item "Message" is arranged in a manner of being superimposed on the two vertical bars of the function "Invitation" and the function "Mail". Furthermore, the information processing device 100 generates the content CT41 in which information indicating the input item "Message" is arranged in the horizontal bar corresponding to the input item "Message".

Furthermore, the information processing device 100 generates the content CT41 in which the horizontal bar corresponding to the input item "Game" is arranged in a manner of being superimposed on the one vertical bar of the function "Invitation". Furthermore, the information processing device 100 generates the content CT41 in which information indicating the input item "Game" is arranged in the horizontal bar corresponding to the input item "Game".

Furthermore, the information processing device 100 generates the content CT41 in which the horizontal bar corresponding to the input item "Volume" is arranged in a manner of being superimposed on the one vertical bar of the function "VoiceChat". Furthermore, the information processing device 100 generates the content CT41 in which information indicating the input item "Volume" is arranged in the horizontal bar corresponding to the input item "Volume".

Then, the information processing device 100 transmits the content CT41 to the terminal device 10. The terminal device 10 displays the content CT41. In such a manner, after the parameter setting for the input item "Friend", the terminal device 10 can present, to the user U1, the input item necessary for executing each of the functions including the input item "Friend". As a result, the user U1 can recognize which input item is necessary to execute each of the functions including the input item "Friend" after the parameter setting for the input item "Friend". Thus, the user U1 can easily perform the input after the parameter setting for the input item "Friend". In addition, as described above, since an overlap of bars indicates in which function each input item is included, it is possible to omit an overlapping display and to perform a compact display.

Then, on the basis of the speech "Message is Are you free now" by the user U1, the terminal device 10 receives character information "Message is Are you free now" as input information IN42. Then, the terminal device 10 transmits the input information IN42 to the information processing device 100. As a result, the information processing device 100 acquires the input information IN42 from the terminal device 10.

Then, the information processing device 100 estimates intent of the input information IN42 by the function of natural language understanding. By the function of natural language understanding, the information processing device 100 estimates that the intent of the input information IN42 is to designate "Are you free now" as the parameter of the input item "Message". Thus, the information processing device 100 determines to set "Are you free now" as the parameter of the input item "Message".

The information processing device 100 generates content CT42 in which the parameter "Are you free now" is set for the input item "Message" that is the input item corresponding to the input information IN42 (Step S42).

The information processing device 100 generates the content CT42 in which information indicating that the parameter set for the input item "Message" is "Are you free now" is arranged in the horizontal bar corresponding to the input item "Message". That is, the information processing device 100 generates the content CT42 in which the display in the horizontal bar corresponding to the input item "Message" is changed from the input item "Message" to the parameter thereof "Are you free now". Furthermore, the information processing device 100 generates the content CT42 in which a color of the horizontal bar corresponding to the input item "Message" is changed to a color corresponding to the input item for which the parameter is already set.

Furthermore, the information processing device 100 generates the content CT42 that displays a vertical bar corresponding to a function that does not include the input item "Message" in a manner of being distinguishable from vertical bars corresponding to the other functions. The information processing device 100 generates the content CT42 that displays the vertical bar corresponding to the function that does not include the input item "Message" in a manner of being distinguishable from the vertical bars corresponding to the other functions by changing a color thereof. In the example of FIG. 11, the information processing device 100 generates the content CT42 in which the color of the vertical bar corresponding to the function "VoiceChat" is made different from the color of the vertical bars corresponding to the function "Invitation" and the function "Mail".

Then, the information processing device 100 transmits the content CT42 to the terminal device 10. The terminal device 10 displays the content CT42. As a result, the user U1 can recognize that the parameter setting for the input item "Friend" and the input item "Message" is completed. Furthermore, since the vertical bar corresponding to the function "VoiceChat" and the vertical bars corresponding to the function "Invitation" and the function "Mail" are displayed in different modes, the user U1 can grasp the function corresponding to his/her input. In addition, the user U1 can recognize that parameter setting of the input item of the function "Mail" is completed.

Then, on the basis of speech "Game is ActionG" by the user U1, the terminal device 10 receives character information "Game is ActionG" as input information IN43. Then, the terminal device 10 transmits the input information IN43 to the information processing device 100. As a result, the information processing device 100 acquires the input information IN43 from the terminal device 10.

Then, the information processing device 100 estimates intent of the input information IN43 by the function of natural language understanding. By the function of natural language understanding, the information processing device 100 estimates that the intent of the input information IN43 is to designate "ActionG" as the parameter of the input item "Game". Thus, the information processing device 100 determines to set "ActionG" as the parameter of the input item "Game".

The information processing device 100 generates content CT43 in which the parameter "ActionG" is set for the input item "Game" that is the input item corresponding to the input information IN43 (Step S43).

The information processing device 100 generates the content CT43 in which information indicating that the parameter set for the input item "Game" is "ActionG" is arranged in the horizontal bar corresponding to the input item "Game". That is, the information processing device 100 generates the content CT43 in which the display in the horizontal bar corresponding to the input item "Game" is changed from the input item "Game" to the parameter thereof "ActionG". Furthermore, the information processing device 100 generates the content CT43 in which a color of the horizontal bar corresponding to the input item "Game" is changed to a color corresponding to the input item for which the parameter is already set.

Furthermore, the information processing device 100 generates the content CT43 that displays a vertical bar corresponding to a function that does not include the input item "Game" in a manner of being distinguishable from vertical bars corresponding to the other functions. The information processing device 100 generates the content CT43 that displays the vertical bar corresponding to the function that does not include the input item "Game" in a manner of being distinguishable from the vertical bars corresponding to the other functions by changing a color thereof. In the example of FIG. 11, the information processing device 100 generates the content CT43 in which the color of the vertical bar corresponding to the function "Mail" in addition to that of the function "VoiceChat" is made different from the color of the vertical bar corresponding to the function "Invitation".

Then, the information processing device 100 transmits the content CT43 to the terminal device 10. The terminal device 10 displays the content CT43. As a result, the user U1 can recognize that the parameter setting for the input item "Friend", the input item "Message", and the input item "Game" is completed. Furthermore, since the vertical bars corresponding to the function "VoiceChat" and the function "Mail" and the vertical bar corresponding to the function "Invitation" are displayed in different modes, the user U1 can grasp the function corresponding to his/her input. In addition, the user U1 can recognize that the parameter setting for the input item of the function "Invitation" is completed. Note that the information processing device 100 may uniquely narrow down and execute a function, or may execute a plurality of functions in a state in which there is a plurality of possibilities.

As described above, the information processing system 1 can provide a GUI that performs a compact display without an overlapping display. In addition, although a conventional U1 display is possible in a large-screen device such as a television (TV), area saving is required in a mobile device or the like. The information processing system 1 can realize area saving by omitting an overlapping display and performing a compact display as described above.

[1-8-1. Display Example in the Display Device]

Figure 12:
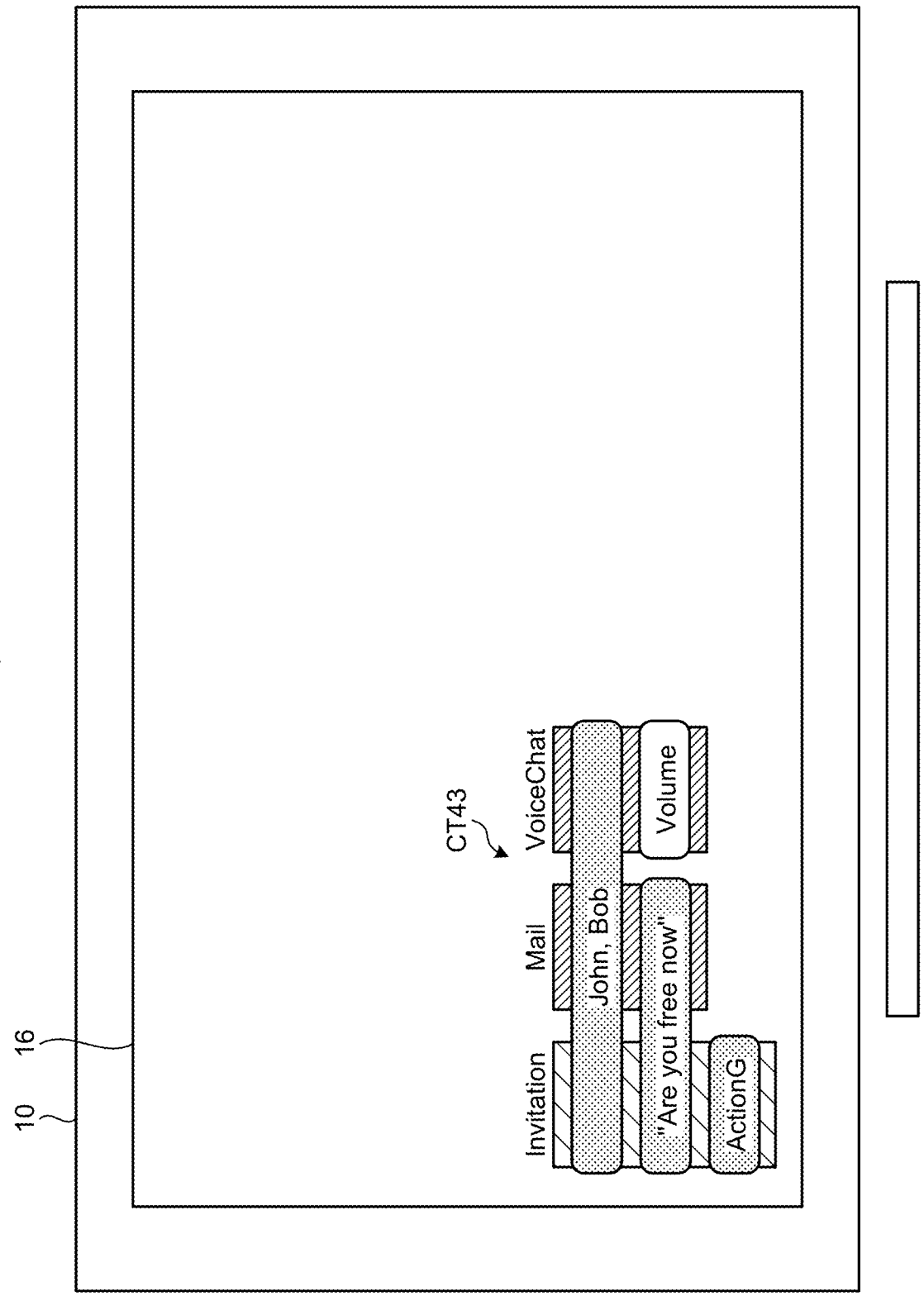
FIG. 12 is a view illustrating an example of a display on the display device.

An example of the compact display of content without the overlapping display which display is illustrated in FIG. 11 will be described with reference to FIG. 12. FIG. 12 is a view illustrating an example of the display on the display device. A case where the terminal device 10 is a television is illustrated as the example in FIG. 12. Note that description of points similar to those in FIG. 11 will be omitted as appropriate.

In the example of FIG. 12, the terminal device 10 that is the television displays the content CT43 on the display unit 16. The terminal device 10 displays the content CT43 in a lower left part of the display unit 16. As described above, since the content CT43 is compact content in which the overlapping display is omitted, the terminal device 10 can display the content CT43 on a part of the display unit 16 without occupying the entire region of the display unit 16. As a result, the user U1 can check the content CT43 while displaying another content on the display unit 16.

[1-9. Processing Example for Other Input Items]

Figure 13:
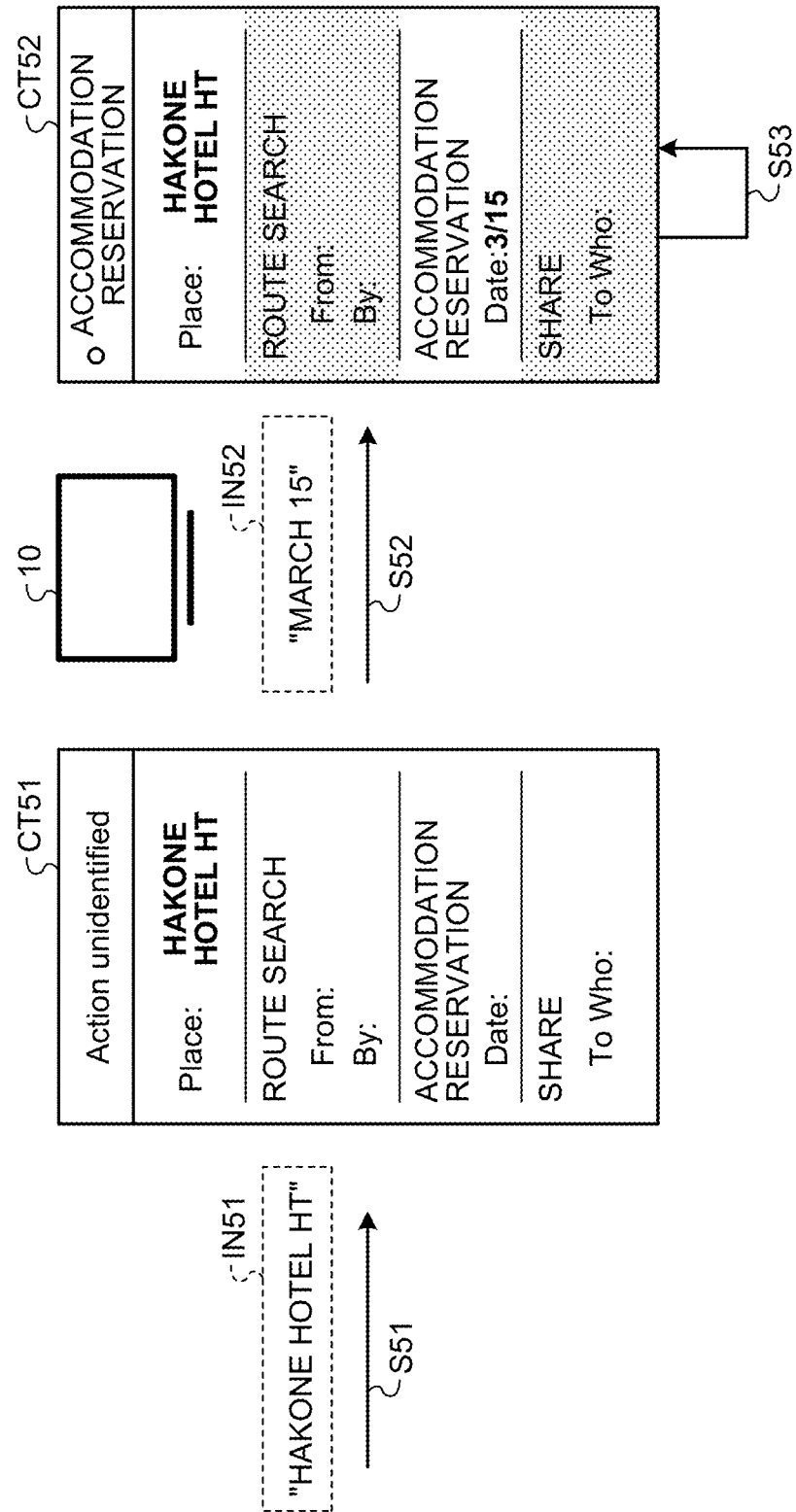
FIG. 13 is a view illustrating an example of processing for another input item.
Figure 14:
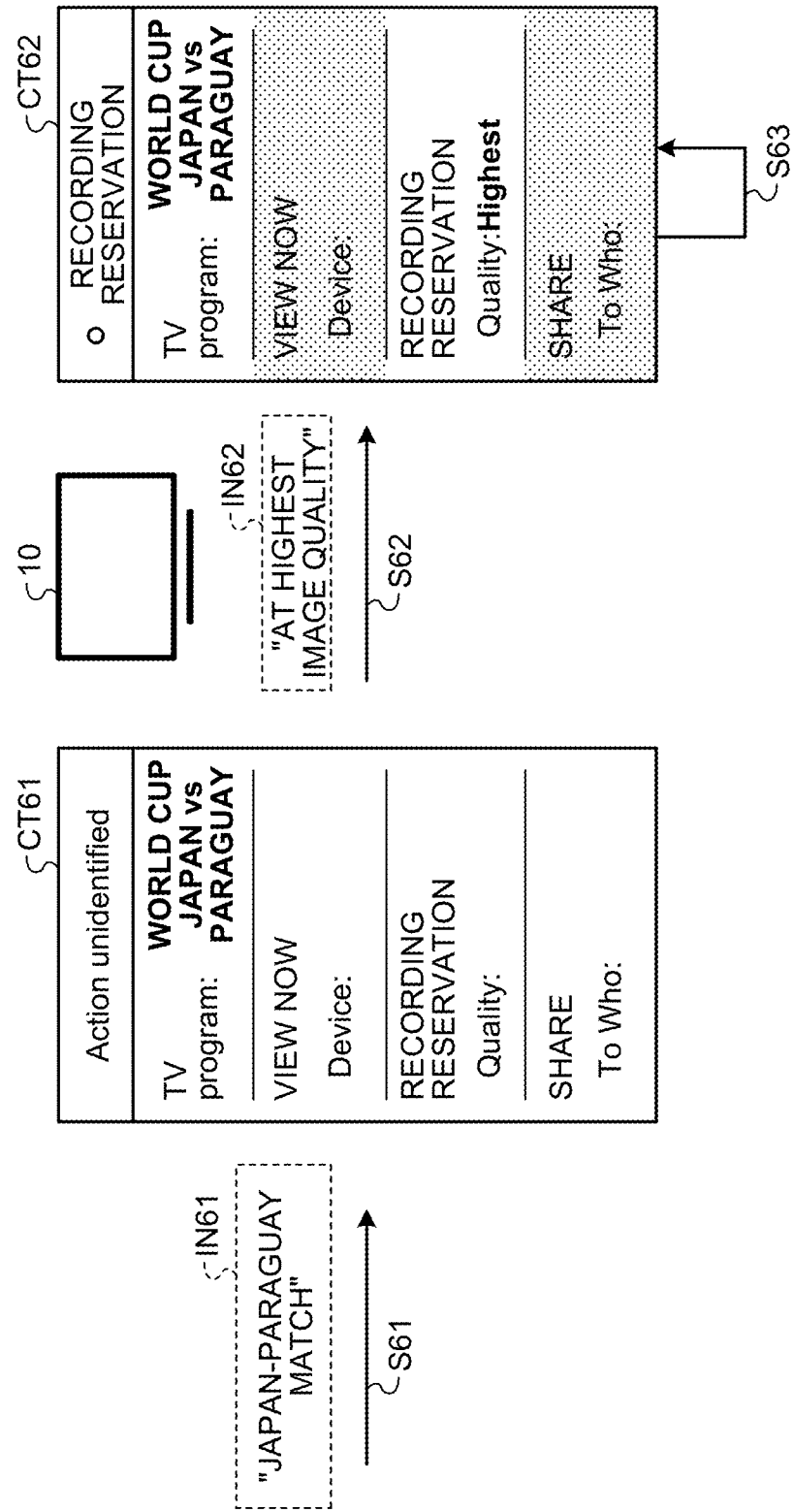
FIG. 14 is a view illustrating another example of processing for another input item.

Next, an example of processing for another input item other than a human element will be described with reference to FIG. 13 and FIG. 14. Note that description of points similar to those in the above description will be omitted as appropriate.

[1-9-1. Processing Example for an Input Item Related to a Place]

First, a processing example for an input item related to a place will be described with reference to FIG. 13. FIG. 13 is a view illustrating an example of processing for another input item.

The user U1 who uses the terminal device 10 speaks "Hakone Hotel HT". It is assumed that the Hakone Hotel HT is a name of a specific hotel located at the place "Hakone". The terminal device 10 receives character information "Hakone Hotel HT" corresponding to the speech "Hakone Hotel HT" by the user U1 as input information IN51. Then, the terminal device 10 transmits the input information IN51 to the information processing device 100. As a result, the information processing device 100 acquires the input information IN51 from the terminal device 10.

Then, the information processing device 100 estimates intent of the input information IN51 by the function of natural language understanding. The information processing device 100 estimates that the intent of the input information IN51 is an input of an input item "Place". The information processing device 100 generates content CT51 that displays an input item of each function including the input item "Place" that is the corresponding input item corresponding to the input information of the user U1 (Step S51). First, the information processing device 100 extracts, from among the functions, the function including the input item "Place" as the input item. In the example of FIG. 13, the information processing device 100 extracts a function "route search", a function "accommodation reservation", a function "share", and the like as the functions including the input item "Place".

The information processing device 100 sets "Hakone Hotel HT" as a parameter of the input item "Place" that is the corresponding input item, and generates the content CT51. Furthermore, the information processing device 100 generates the content CT51 that displays a union of input items of the function "route search", the function "accommodation reservation", and the function "share" including the input item "Place".

Here, with respect to input items other than the input item "Place" that is the corresponding input item, the information processing device 100 generates the content CT51 that displays, in association with each function, an input item of the function. In addition, the information processing device 100 generates the content CT51 that displays, next to a character string of the function "route search", an input item "From" and an input item "By" of the function. In addition, the information processing device 100 generates the content CT51 that displays, next to a character string of the function "accommodation reservation", an input item "Date" of the function. In addition, the information processing device 100 generates the content CT51 that displays, next to a character string of the function "share", an input item "To who" of the function.

As a result, the information processing device 100 generates the content CT51 in which the input item "Place" for which the parameter is already set is arranged in an upper part and a list of the functions including the input item "Place" and the input items of the functions is arranged below. In addition, since there is no executable function, the information processing device 100 generates the content CT51 in which information such as "Action unidentified" indicating that no function is specified is arranged in the upper part. Then, the information processing device 100 transmits the content CT51 to the terminal device 10. The terminal device 10 displays the content CT51. In addition, for example, at a position different from a display position of the content CT51, the terminal device 10 displays information related to a place. Note that the terminal device 10 may display the information related to the place on a screen different from the screen on which the content CT51 is displayed (such as display unit 16).

Then, in response to the speech "March 15" by the user U1, the terminal device 10 receives, as input information IN52, character information "March 15" corresponding to the speech by the user U1. Then, the terminal device 10 transmits the input information IN52 to the information processing device 100. As a result, the information processing device 100 acquires the input information IN52 from the terminal device 10.

Then, the information processing device 100 estimates intent of the input information IN52 by the function of natural language understanding. By the function of natural language understanding, the information processing device 100 estimates that the intent of the input information IN52 is to designate "March 15" as a parameter of the input item "Date". Thus, the information processing device 100 determines to set "March 15" as the parameter of the input item "Date".

The information processing device 100 generates content CT52 in which the parameter "March 15" is set for the input item "Date" that is the input item corresponding to the input information IN52 (Step S52). Then, the information processing device 100 determines a function to be a candidate of execution (execution candidate function). In the example of FIG. 13, the information processing device 100 determines the function "accommodation reservation" as the execution candidate function. The information processing device 100 generates the content CT52 in which information indicating that the function "accommodation reservation" is executable is arranged in an upper part.

Here, the information processing device 100 generates the content CT52 that displays a list of the other functions "route search" and "share" together with the function "accommodation reservation" determined as the execution candidate function. The information processing device 100 generates the content CT52 in which colors of the function "route search", the input item "From" and the input item "By" thereof, the function "share", and the input item "To Who" thereof are lightened. As a result, the information processing device 100 can generate the content of distinguishably displaying the execution candidate function while displaying the list of the plurality of functions.

Then, the information processing device 100 transmits the content CT52 to the terminal device 10. The terminal device 10 displays the content CT52. As a result, the user U1 can recognize that the parameter setting for the input item "Place" and the input item "Date" is completed and that the function "accommodation reservation" is executable.

Then, the information processing device 100 executes the function of the function "accommodation reservation". For example, the information processing device 100 executes the function "accommodation reservation" in response to an instruction to execute the function "accommodation reservation" by the user U1. For example, the information processing device 100 performs a display of vacant room information, execution of reservation, and the like as the function "accommodation reservation". The information processing device 100 transmits vacant room information of the Hakone Hotel HT on March 15 to the terminal device 10, and the terminal device 10 displays the vacant room information of the Hakone Hotel HT on March 15.

As described above, the information processing system 1 can be applied to what is other than human elements. For example, in the information processing system 1, a subsequent operation (action) or used function can be determined according to a state of a place to travel. For example, the information processing system 1 can check a place such as a tourist spot, and determine whether to check a train route, a car route, or an airplane route on the basis of access information of the place. In addition, the information processing system 1 can determine whether to move to a reserving action of an accommodation depending on the time necessary for the access. For example, the information processing system 1 can determine the route search or accommodation reservation.

[1-9-2. Processing Example for an Input Item Related to a Program]

Next, a processing example for an input item related to a program will be described with reference to FIG. 14. FIG. 14 is a view illustrating another example of processing for another input item.

The user U1 who uses the terminal device 10 speaks "Japan-Paraguay match". The terminal device 10 receives, as input information IN61, character information "Japan-Paraguay match" corresponding to the speech "Japan-Paraguay match" by the user U1. Then, the terminal device 10 transmits the input information IN61 to the information processing device 100. As a result, the information processing device 100 acquires the input information IN61 from the terminal device 10.

Then, the information processing device 100 estimates intent of the input information IN61 by the function of natural language understanding. The information processing device 100 estimates that the intent of the input information IN61 is an input of an input item "TV program". The information processing device 100 generates content CT61 that displays an input item of each function including the input item "TV program" that is the corresponding input item corresponding to the input information of the user U1 (Step S61). First, the information processing device 100 extracts, from among the functions, the function including the input item "TV program" as the input item. In the example of FIG. 14, the information processing device 100 extracts a function "view now", a function "recording reservation", a function "share", and the like as the functions including the input item "TV program".

The information processing device 100 sets "Japan-Paraguay match" as a parameter of the input item "TV program" that is the corresponding input item, and generates the content CT61. Furthermore, the information processing device 100 generates the content CT61 that displays a union of input items of the function "view now", the function "recording reservation", and the function "share" including the input item "TV program".

Here, with respect to input items other than the input item "TV program" that is the corresponding input item, the information processing device 100 generates the content CT61 that displays, in association with each function, an input item of the function. For example, the information processing device 100 generates the content CT61 that displays, next to a character string of the function "view now", an input item "Device" of the function. In addition, the information processing device 100 generates the content CT61 that displays, next to a character string of the function "recording reservation", an input item "Quality" of the function. In addition, the information processing device 100 generates the content CT61 that displays, next to a character string of the function "share", an input item "To who" of the function.

As a result, the information processing device 100 generates the content CT61 in which the input item "TV program" for which the parameter is already set is arranged in an upper part and a list of the functions including the input item "TV program" and the input items of the functions is arranged below. In addition, since there is no executable function, the information processing device 100 generates the content CT61 in which information such as "Action unidentified" indicating that no function is specified is arranged in the upper part. Then, the information processing device 100 transmits the content CT61 to the terminal device 10. The terminal device 10 displays the content CT61. In addition, the terminal device 10 displays program information and the like, for example, at a position different from a display position of the content CT61. Note that the terminal device 10 may display the program information on a screen different from the screen on which the content CT61 is displayed (such as display unit 16).

Then, in response to speech "highest image quality" by the user U1, the terminal device 10 receives, as input information IN62, character information "at the highest image quality" corresponding to the speech by the user U1. Then, the terminal device 10 transmits the input information IN62 to the information processing device 100. As a result, the information processing device 100 acquires the input information IN62 from the terminal device 10.

Then, the information processing device 100 estimates intent of the input information IN62 by the function of natural language understanding. By the function of natural language understanding, the information processing device 100 estimates that the intent of the input information IN62 is to designate "highest image quality" as a parameter of the input item "Quality". Thus, the information processing device 100 determines to set "highest image quality" as the parameter of the input item "Quality".

The information processing device 100 generates the content CT62 in which the parameter "highest image quality" is set for the input item "Quality" that is the input item corresponding to the input information IN62 (Step S62). Then, the information processing device 100 determines a function to be a candidate of execution (execution candidate function). In the example of FIG. 14, the information processing device 100 determines the function "recording reservation" as the execution candidate function. The information processing device 100 generates the content CT62 in which information indicating that the function "recording reservation" is executable is arranged in an upper part.

Here, the information processing device 100 generates the content CT62 that displays a list of the other functions "view now" and "share" together with the function "recording reservation" determined as the execution candidate function. The information processing device 100 generates the content CT62 in which colors of the function "view now", the input item "Device" thereof, the function "share", and the input item "To Who" thereof are lightened. As a result, the information processing device 100 can generate the content of distinguishably displaying the execution candidate function while displaying the list of the plurality of functions.

Then, the information processing device 100 transmits the content CT62 to the terminal device 10. The terminal device 10 displays the content CT62. As a result, the user U1 can recognize that the parameter setting for the input item "TV program" and the input item "Quality" is completed and that the function "recording reservation" is executable.

Then, the information processing device 100 executes the function of the function "recording reservation". For example, the information processing device 100 executes the function "recording reservation" in response to an instruction to execute the function "recording reservation" by the user U1. For example, the information processing device 100 performs, as the function "recording reservation", execution of a recording reservation of a television program of the Japan-Paraguay match, or the like. The information processing device 100 transmits, to the terminal device 10, information instructing the recording reservation of the Japan-Paraguay match at the highest image quality, and the terminal device 10 registers the recording reservation of the Japan-Paraguay match at the highest image quality.

As described above, the information processing system 1 can be applied to what is other than human elements. For example, in the information processing system 1, an execution function can be determined according to a state of a TV program (on the air, time, or degree of desire to watch). For example, the information processing system 1 can issue a command for searching for a program to a TV or the like, and view the command as it is on the device according to the result. For example, in the information processing system 1, the TV program can be watched on a TV, a smartphone, a tablet, a PC, or the like.

[1-10. Display Example of an Input Item in the Display Device]

Figure 15:
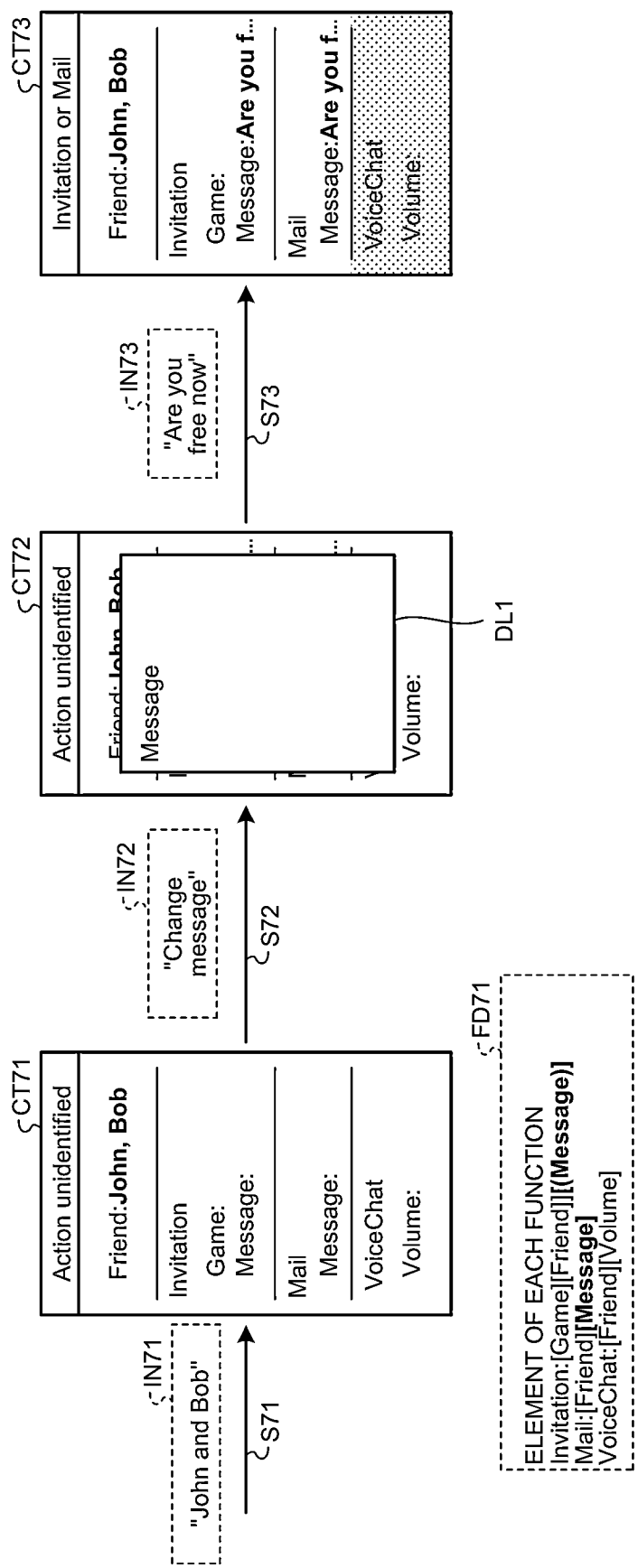
FIG. 15 is a view illustrating an example of a display of an input item on the display device.

Note that an input of information in the terminal device 10 may be performed in various modes. For example, the input of information in the terminal device 10, is not limited to a direct input to one panel. A dialog may be opened or an information input may be performed on another screen. This point will be described with reference to FIG. 15. FIG. 15 is a view illustrating an example of a display of an input item on the display device. Note that description of points similar to those in the above description will be omitted as appropriate.

The terminal device 10 transmits character information "John and Bob" based on speech by the user U1 to the information processing device 100 as input information IN71. As a result, the information processing device 100 acquires the input information IN71 from the terminal device 10.

Then, by the function of natural language understanding, the information processing device 100 estimates that intent of the input information IN71 is an input of the input item "Friend". The information processing device 100 generates content CT71 that displays the input item of each function including the input item "Friend" that is the corresponding input item corresponding to the input information of the user U1 (Step S71). The information processing device 100 extracts the function "Invitation", the function "Mail", the function "VoiceChat", and the like as the functions including the input item "Friend". A function information group FD71 indicates input items of each function similarly to the function information group FD31 in FIG. 10.

The information processing device 100 sets "John" and "Bob" as parameters of the input item "Friend" that is the corresponding input item, and generates the content CT71. In addition, the information processing device 100 generates the content CT71 that displays a union of the input items of the function "Invitation", the function "Mail", and the function "VoiceChat" including the input item "Friend". The information processing device 100 generates the content CT71 that displays, next to a character string of the function "Invitation", the input item "Game" and the input item "Message" that are essential input items thereof. In addition, the information processing device 100 generates the content CT71 that displays, next to a character string of the function "Mail", the input item "Message" that is an essential input item thereof. In addition, the information processing device 100 generates the content CT71 that displays, next to a character string of the function "VoiceChat", the input item "Volume" that is an essential input item thereof. In addition, since there is no executable function, the information processing device 100 generates the content CT71 in which information such as "Action unidentified" indicating that no function is specified is arranged in an upper part.

Then, the information processing device 100 transmits the content CT71 to the terminal device 10. The terminal device 10 displays the content CT71.

Then, the user U1 who checks the content CT71 speaks "Change message". The terminal device 10 detects the speech "Change message" by the user U1. Then, the terminal device 10 receives character information "Change message" as input information IN72 by the function of automatic speech recognition. Then, the terminal device 10 transmits the input information IN72 to the information processing device 100. As a result, the information processing device 100 acquires the input information IN72 from the terminal device 10.

Then, the information processing device 100 estimates intent of the input information IN72 by the function of natural language understanding. By the function of natural language understanding, the information processing device 100 estimates that the intent of the input information IN72 is to change the parameter of the input item "Message". Thus, the information processing device 100 determines that an input item a parameter of which is to be changed is the input item "Message".

The information processing device 100 generates content CT72 including a dialog DL1 that receives an input of the parameter of the input item "Message" (Step S72). The information processing device 100 generates the dialog DL1 including character information indicating that an input target is the input item "Message". For example, the information processing device 100 generates the content CT72 in which the dialog DL1 is superimposed on a central part of the content CT71.

Then, the information processing device 100 transmits the content CT72 to the terminal device 10. The terminal device 10 displays the content CT72. As a result, the user U1 can recognize that the input target is the input item "Message". As described above, in the information processing system 1, it is possible to narrow down input items to be input according to the input by the user. Note that the information processing device 100 may transmit only the dialog DL1 to the terminal device 10, and the terminal device 10 that receives the dialog DL1 may superimpose and display the dialog DL1 on the content CT71.

Then, the user U1 speaks "Message is Are you free now". Note that subsequent processing is similar to that in FIG. 10 and thus description thereof is omitted. For example, since processing in Step S73 is similar to that in Step S32 in FIG. 10, description thereof is omitted.

[1-11. Example of a Relationship Between Display and a Data Structure]

Here, the relationship between the display and the data structure will be described with reference to FIG. 16 and FIG. 17. Note that description of points similar to those in the above description will be omitted as appropriate.

[1-11-1. Conventional Example]

First, an example of a non-dialog format will be described with reference to FIG. 16. FIG. 16 is a view illustrating an example of a relationship between a conventional display and a data structure. Content CT75 indicates an example of the conventional display.

Figure 16:
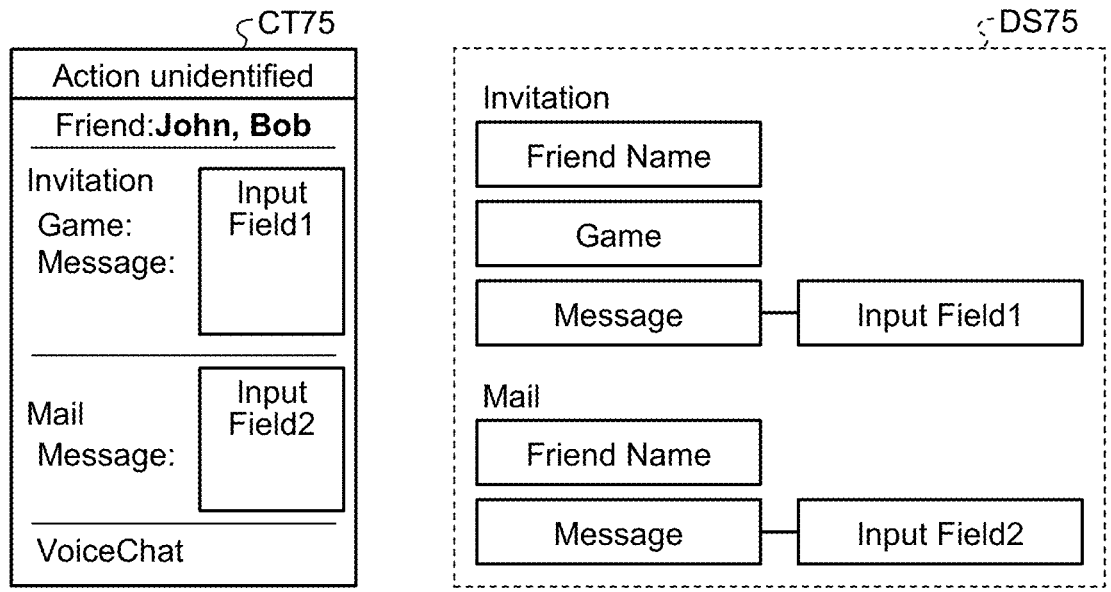
FIG. 16 is a view illustrating an example of a relationship between a conventional display and a data structure.

The content CT75 illustrated in FIG. 16 indicates a state in which "John" and "Bob" are set as parameters of the input item "Friend". In the content CT75, the function "Invitation", the function "Mail", and the function "VoiceChat" are displayed in a list as functions including the input item "Friend".

Here, in the content CT75, an input box displaying "Input Field1" into which a parameter of the input item "Message" of the function "Invitation" is input is displayed at a position corresponding to the function "Invitation". Furthermore, in the content CT75, an input box displaying "Input Field2"

into which a parameter of the input item "Message" of the function "Mail" is input is displayed at a position corresponding to the function "Mail". For example, conventionally, an input box is arranged for each function. As described above, conventionally, it is necessary to individually provide, for each input area of each function, an input GUI corresponding to a region/position thereof, and a mounting cost is large. In addition, in a format of the conventional content CT75, an acquisition structure of each piece of data is directly associated with information of each input area as illustrated in a data structure DS75.

[1-11-2. Example of a Dialog Format]

Next, an example of the dialog format will be described with reference to FIG. 17. FIG. 17 is a view illustrating an example of a relationship between display and a data structure. Content CT72 corresponds to the content CT72 in FIG. 15.

Figure 17:
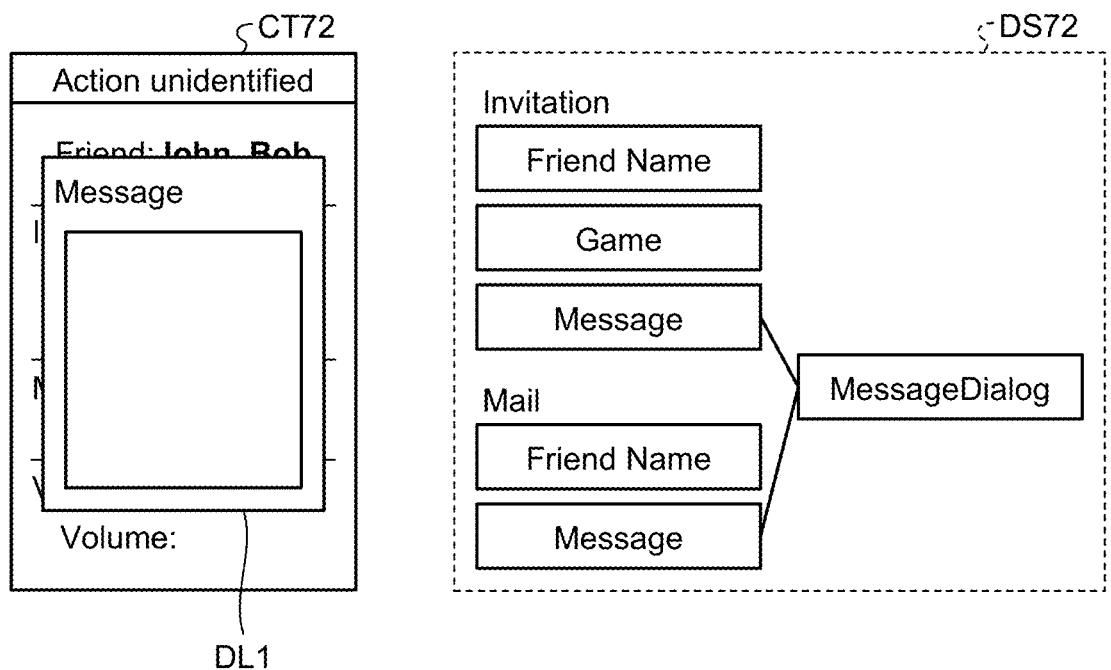
FIG. 17 is a view illustrating an example of a relationship between display and a data structure.

In the example of FIG. 17, a parameter of the input item "Message" is acquired by the dialog DL1. As described above, in the example of FIG. 17, regarding an element requiring the corresponding information (input item "Message"), an input result of the user is acquired from a Message dialog used in common. Thus, it is not necessary to individually prepare an input area. In addition, in a format of the content CT72, as illustrated in a data structure DS72, each of the input item "Message" of the function "Invitation" and the input item "Message" of the function "Mail" is commonly associated with "MessageDialog" corresponding to the dialog DL1. As a result, a parameter of the input item "Message" acquired by the dialog DL1 is reflected in both the input item "Message" of the function "Invitation" and the input item "Message" of the function "Mail".

[1-12. Display Example of an Input Target]

Figure 19:
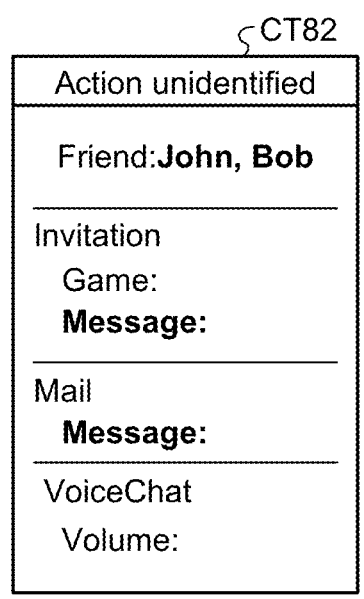
FIG. 19 is a view illustrating an example of the display of the input target.
Figure 20:
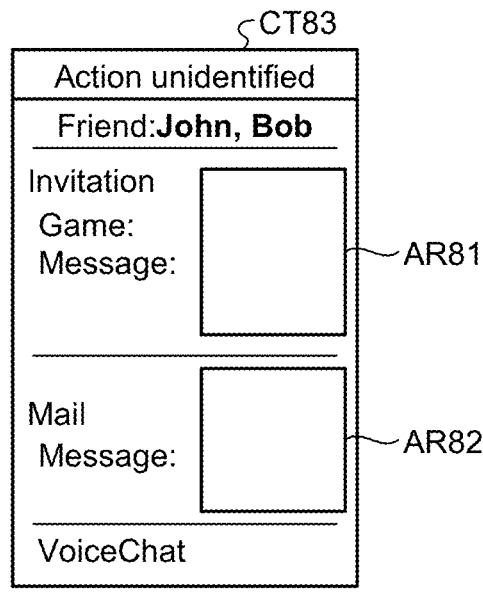
FIG. 20 is a view illustrating an example of the display of the input target.

Here, a display example that indicates an input target and that is other than the dialog format will be described with reference to FIGS. 18 to 20. Note that description of points similar to those in the above description will be omitted as appropriate.

[1-12-1. Side Panel]

First, an example of a side-panel format will be described with reference to FIG. 18. FIG. 18 is a view illustrating an example of a display of an input target. Specifically, FIG. 18 is a view illustrating an example of a display of an input target in the side-panel format.

Figure 18:
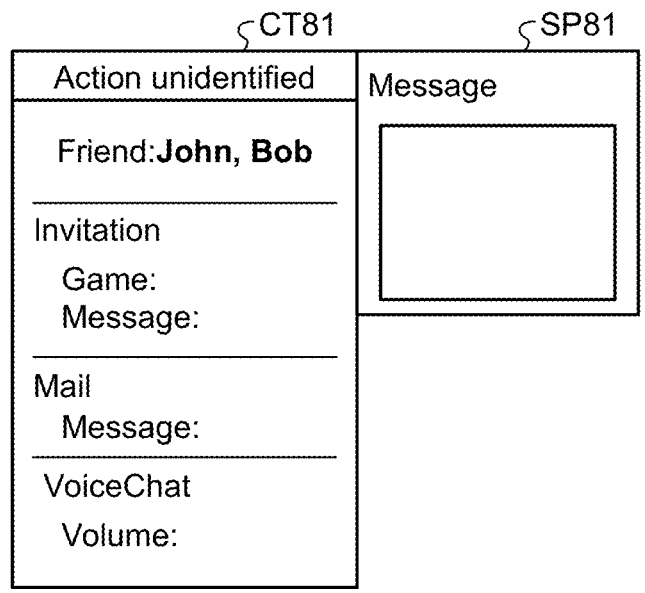
FIG. 18 is a view illustrating an example of a display of an input target.

Content CT81 that is a panel illustrated in FIG. 18 indicates a state in which "John" and "Bob" are set as parameters of the input item "Friend". In the content CT81, the function "Invitation", the function "Mail", and the function "VoiceChat" are displayed in a list as functions including the input item "Friend". The information processing device 100 generates the content CT81 in which "John" and "Bob" are set as the parameters of the input item "Friend" and the function "Invitation", the function "Mail", and the function "VoiceChat" are displayed in the list. The terminal device 10 displays the content CT81.

In the example of FIG. 18, a side panel SP81 is arranged as a side panel of the content CT81. The side panel SP81 is arranged continuous with an upper right part of the content CT81. The information processing device 100 generates the side panel SP81 including character information indicating that an input target is the input item "Message", and performs transmission thereof to the terminal device 10. The terminal device 10 displays the side panel SP81 in a manner of being continuous with the upper right part of the content CT81. In such a manner, the terminal device 10 displays the content CT81 and the side panel SP81. Note that a display position of the side panel SP81 is not limited to a position continuous with the upper right part of the content CT81, and may be any position. As a result, the user U1 can recognize that the input target is the input item "Message".

[1-12-2. Highlighting on the Same Panel]

Next, an example of a format of performing highlighting on the same panel will be described with reference to FIG. 19. FIG. 19 is a view illustrating an example of a display of an input target. Specifically, FIG. 19 is a view illustrating an example of a display of an input target in the format of performing highlighting on the same panel. Note that description of points similar to those in FIG. 18 will be omitted as appropriate.

Content CT82 that is a panel illustrated in FIG. 18 indicates a state in which "John" and "Bob" are set as parameters of the input item "Friend". In the content CT82, the function "Invitation", the function "Mail", and the function "VoiceChat" are displayed in a list as functions including the input item "Friend". The information processing device 100 generates the content CT82 in which the input item "Message" is highlighted and displayed in order to indicate that an input target is the input item "Message". The information processing device 100 generates the content CT82 in which information corresponding to the input item "Message" that is the input target is highlighted and displayed in bold. The terminal device 10 displays the content CT82. As a result, the user HT1 can recognize that the input target is the input item "Message".

[1-12-3. Scaling on the Same Panel]

Next, an example of a format of scaling on the same panel will be described with reference to FIG. 20. FIG. 20 is a view illustrating an example of the display of the input target. Specifically, FIG. 20 is a view illustrating an example of a display of the input target in the format of scaling on the same panel. Note that description of points similar to those in FIG. 18 and FIG. 19 will be omitted as appropriate.

Content CT83 that is a panel illustrated in FIG. 18 indicates a state in which "John" and "Bob" are set as parameters of the input item "Friend". In the content CT83, the function "Invitation", the function "Mail", and the function "VoiceChat" are displayed in a list as functions including the input item "Friend". The information processing device 100 generates the content CT83 in which a panel is arranged at a position corresponding to the input item "Message" in order to indicate that an input target is the input item "Message". The information processing device 100 generates the content CT83 in which a panel AR81 is arranged at a position corresponding to the input item "Message" of the function "Invitation" and a panel AR82 is arranged at a position corresponding to the input item "Message" of the function "Mail". The terminal device 10 displays the content CT83. As a result, the user U1 can recognize that the input target is the input item "Message".

[1-13. Display Example of an Executable Function]

Figure 21:
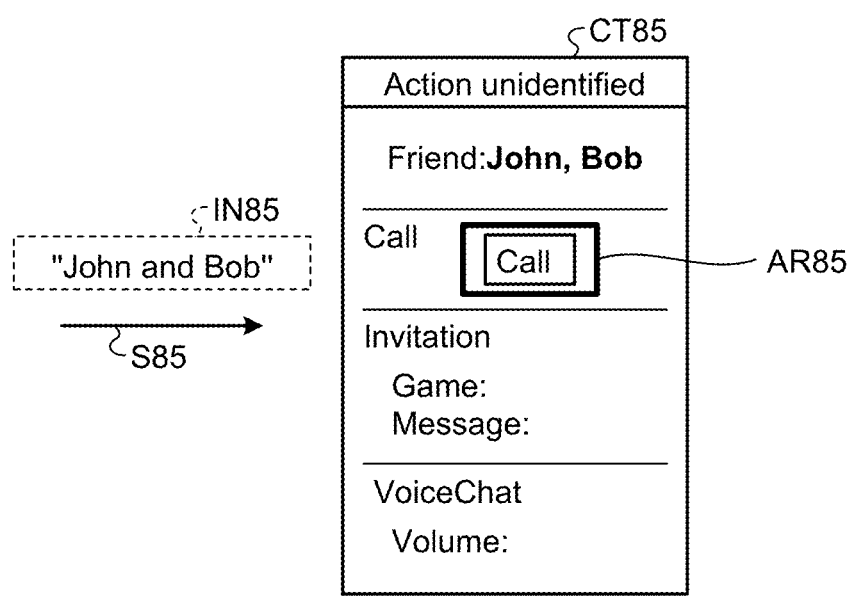
FIG. 21 is a view illustrating an example of a display of an executable function.

Next, an example of a display of an executable function will be described with reference to FIG. 21. FIG. 21 is a view illustrating an example of the display of the executable function. Note that description of points similar to those in the above description will be omitted as appropriate.

The terminal device 10 transmits character information "John and Bob" based on the speech by the user U1 to the information processing device 100 as input information IN85. As a result, the information processing device 100 acquires the input information IN85 from the terminal device 10.

Then, by the function of natural language understanding, the information processing device 100 estimates that intent of the input information IN85 is an input of the input item "Friend". The information processing device 100 generates content CT85 that displays the input item of each function including the input item "Friend" that is the corresponding input item corresponding to the input information of the user U1 (Step S85). The information processing device 100 extracts the function "Call", the function "Invitation", the function "VoiceChat", and the like as the functions including the input item "Friend". A function information group FD31 indicates input items of each function similarly to the function information group FD21 in FIG. 9.

The information processing device 100 sets "John" and "Bob" as parameters of the input item "Friend" that is the corresponding input item, and generates the content CT85. In addition, the information processing device 100 generates the content CT85 that displays a union of the input items of the function "Call", the function "Invitation", and the function "VoiceChat" including the input item "Friend". With respect to input items other than the input item "Friend" that is the corresponding input item, the information processing device 100 generates the content CT85 that displays, in association with each function, an input item of the function.

Here, in the example of FIG. 21, it is assumed that the function "Call" only has the input item "Friend" as an essential input item. Thus, the information processing device 100 determines the function "Call" as an execution candidate function. Then, the information processing device 100 generates the content CT85 in which a character string "Call" surrounded by a frame is arranged in a region AR85 near the function "Call". The information processing device 100 transmits the content CT85 to the terminal device 10, and the terminal device 10 displays the content CT85. In this case, the terminal device 10 can clearly indicate the function that can be executed by the user in the middle. Then, in a case where the user U1 instructs execution of the function "Call" by voice or performs operation of selecting the frame in which the character string "Call" is described, the information processing device 100 executes the function "Call".

[1-14. Display Example of a Plurality of Candidates]

Figure 22:
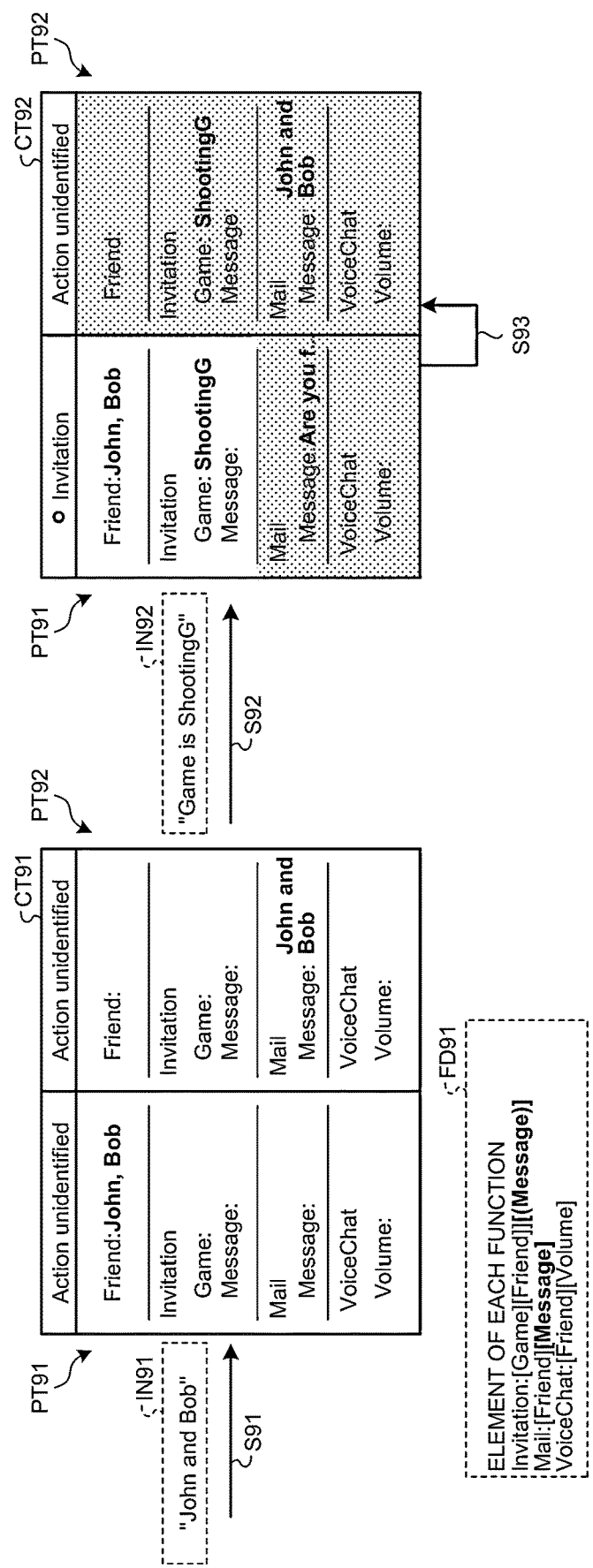
FIG. 22 is a view illustrating an example of a display of a plurality of candidates.

Note that a case where there is a plurality of input items corresponding to an input by the user will be described with reference to FIG. 22 although a case where one input item corresponding to an input by the user can be specified has been described in the above example. FIG. 22 is a view illustrating an example of a display of a plurality of candidates. Note that description of points similar to those in the above description will be omitted as appropriate.

First, character information "John and Bob" is received as input information IN91 according to the speech "John and Bob" by the user U1 who uses the terminal device 10. Then, the terminal device 10 transmits the input information IN91 to the information processing device 100. As a result, the information processing device 100 acquires the input information IN91 from the terminal device 10.

Then, the information processing device 100 estimates intent of the input information IN91 by the function of natural language understanding. The information processing device 100 estimates that the intent of the input information IN91 is an input of the input item "Friend" or the input item "Message". The information processing device 100 generates content CT91 that displays the input item of each function including the input item "Friend" or the input item "Message" that is the corresponding input item corresponding to the input information of the user U1 (Step S91). First, the information processing device 100 extracts, from among the functions, the function including the input item "Friend" or the input item "Message" as the input item. In the example of FIG. 22, the information processing device 100 extracts the function "Invitation", the function "Mail", the function "VoiceChat", and the like as the functions including the input item "Friend". A function information group FD91 indicates input items of each function similarly to the function information group FD2l in FIG. 22.

Specifically, the information processing device 100 generates the content CT91 in which a panel PT91 in which "John" and "Bob" are set as parameters of the input item "Friend" is arranged in a left half and a panel PT92 in which "John and Bob" is set as a parameter of the input item "Message" is arranged in a right half. In the example of FIG. 22, a case where the parameter "John and Bob" is set only for the function "Mail" including the input item "Message" as an essential input item among the input items "Message" in the panel PT92 is illustrated. Note that the parameter "John and Bob" may be also set for the input item "Message" of the function "Invitation" including the input item "Message" as an optional input item. Furthermore, the panel PT92 may be a display in which the input item "Message" is arranged on an upper part and "John and Bob" is set as the parameter of the input item "Message".

In addition, since there is no executable function on a side of the panel PT91, the information processing device 100 generates the panel PT91 in which information such as "Action unidentified" indicating that no function is specified is arranged in an upper part. In addition, since there is no executable function on a side of the panel PT92, the information processing device 100 generates the panel PT92 in which information such as "Action unidentified" indicating that no function is specified is arranged in an upper part. As a result, the information processing device 100 generates the content CT91.

Then, the information processing device 100 transmits the content CT91 to the terminal device 10. The terminal device 10 displays the content CT91. As a result, the user U1 can check how his/her input is reflected, and can easily perform the subsequent input.

Then, in response to speech "Game is ShootingG" by the user U1 who checks the content CT91, the terminal device 10 receives character information "Game is ShootingG" corresponding to the speech by the user U1 as input information IN92. Then, the terminal device 10 transmits the input information IN92 to the information processing device 100. As a result, the information processing device 100 acquires the input information IN92 from the terminal device 10.

Then, the information processing device 100 estimates intent of the input information IN92 by the function of natural language understanding. By the function of natural language understanding, the information processing device 100 estimates that the intent of the input information IN92 is to designate "ShootingG" as the parameter of the input item "Game". Thus, the information processing device 100 determines to set "ShootingG" as the parameter of the input item "Game".

The information processing device 100 generates content CT92 in which the parameter "ShootingG" is set for the input item "Game" that is the input item corresponding to the input information IN92 (Step S92). The information processing device 100 sets the parameter "ShootingG" for the input item "Game" in the panel PT91 and updates the display on the panel PT91. Furthermore, the information processing device 100 sets the parameter "ShootingG" for the input item "Game" in the panel PT92 and updates the display on the panel PT92. As a result, the information processing device 100 generates the content CT92.

Furthermore, since there is the executable function "Invitation" on the side of the panel PT91, the information processing device 100 updates the display on the panel PT91 to a display in an upper part of which information such as "Invitation" indicating that the function "Invitation" is specified is arranged. In addition, since there is no executable function on the side of the panel PT92, the information processing device 100 keeps, on the display on the panel PT91, the information such as "Action unidentified" indicating that no function is specified being arranged in the upper part. As a result, the information processing device 100 generates the content CT92.

Here, the information processing device 100 displays the information of the function "Invitation" on the side of the panel PT91 in a manner of being distinguishable from the other information by lightening a color of the information other than that of the function "Invitation" on the side of the panel PT91 which function is determined to be the execution candidate function. As a result, the information processing device 100 can generate the content of distinguishably displaying the execution candidate function while displaying the list of the plurality of functions.

Then, the information processing device 100 executes the function "Invitation" (Step S93). For example, the information processing device 100 executes the function "Invitation" in response to an instruction from the user U1.

As described above, the information processing system 1 displays a plurality of possibilities on separate panels as indicated by the panels PT91 and PT92. In such a manner, in a case where an entity (input item) cannot be uniquely specified on the basis of the input by the user, the information processing system 1 arranges GUIs indicating a plurality of possibilities, and selects a side on which a function is specified earlier in the subsequent speech or employs a side being looked at during the speech depending on a line-of-sight position or the like. For example, in a case where execution is to be performed in a state in which the specification cannot be made uniquely, the information processing system 1 may ask the user which one of the candidate functions is intended or cause the user to make selection. As a result, the information processing system 1 can facilitate the input by the user.

[1-15. Display Example of a Macro]

Figure 23:
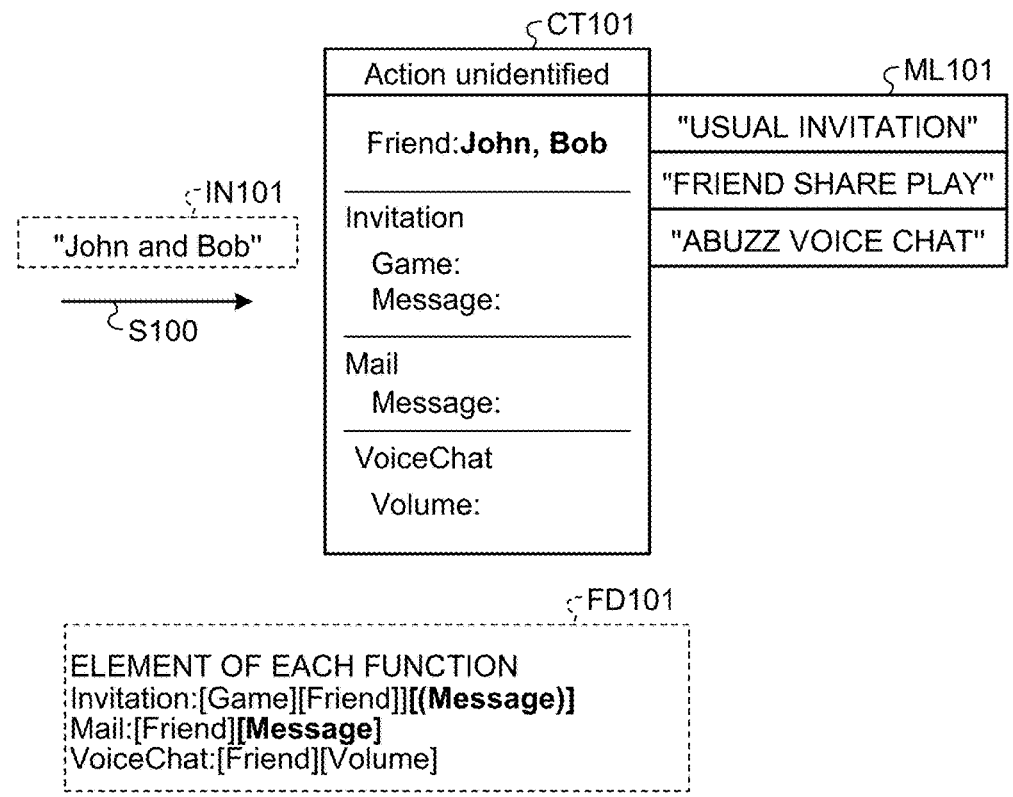
FIG. 23 is a view illustrating an example of a display of a macro.

Note that not only input items and functions but also various kinds of information may be displayed. This point will be described with reference to FIG. 23. FIG. 23 is a view illustrating an example of a display of a macro. Note that description of points similar to those in the above description will be omitted as appropriate.

First, character information "John and Bob" is received as input information IN101 according to the speech "John and Bob" by the user U1 who uses the terminal device 10. Then, the terminal device 10 transmits the input information IN101 to the information processing device 100. As a result, the information processing device 100 acquires the input information IN101 from the terminal device 10.

Then, the information processing device 100 estimates intent of the input information IN101 by the function of natural language understanding. The information processing device 100 estimates that the intent of the input information IN101 is an input of the input item "Friend". The information processing device 100 generates content CT101 that displays the input item of each function including the input item "Friend", and a macro list ML101 (Step S100).

The information processing device 100 generates the macro list ML101 by using macro information stored in the storage unit 120 (see FIG. 3). The information processing device 100 extracts a macro having an element corresponding to the input item "Friend" from the macro information of macros. In FIG. 23, the information processing device 100 extracts three macros "usual invitation", "friend share play", and "abuzz voice" as the macros having the element corresponding to the input item "Friend". Then, the information processing device 100 generates the macro list ML101 that displays a list of the extracted macros. Note that since generation of the content CT101 is similar to the generation of the content CT21 in FIG. 9, description thereof is omitted.

Then, the information processing device 100 transmits the content CT101 and the macro list ML101 to the terminal device 10. The terminal device 10 displays the content CT101 and the macro list ML101. As a result, the user U1 can check the macros corresponding to his/her input and easily perform the subsequent input such as execution of the macros.

As described above, the information processing system 1 provides a method of transitioning to the macros (collectively executed) or the like. Specifically, the information processing system 1 searches Entity information, which is filled with the speech by the user, for macros that may correspond, and performs an adjacent display. The information processing system 1 searches for (extracts) the macros having the element corresponding to the input item "Friend", and displays the macro list ML101, in which the macros are listed, adjacent to the content CT101. As a result, the information processing system 1 presents the list of the macros having a Friend element, and enables the user to perform immediate access. For example, in the information processing system 1, when the user commands "usual invitation", John and Bob are used as invitation partners in the macro, and the macro is executed.

[1-16. Execution Example of a Plurality of Functions]

Figure 24:
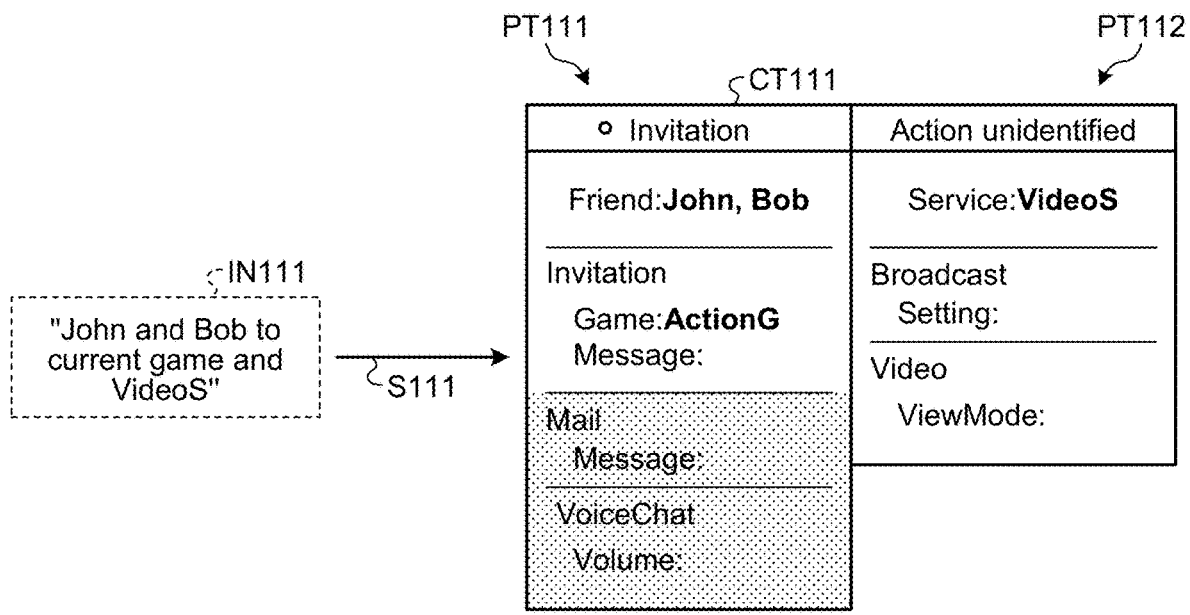
FIG. 24 is a view illustrating an example of execution of a plurality of functions.

Note that a plurality of functions may be executed. For example, in a case where a complex sentence or the like is spoken and the speech is over a plurality of functions, the terminal device 10 may simultaneously display a plurality of corresponding GUIs (panels). This point will be described with reference to FIG. 24. FIG. 24 is a view illustrating an example of execution of a plurality of functions. Note that description of points similar to those in the above description will be omitted as appropriate. Note that a case where "ActionG" is already set as the parameter of the input item "Game" will be described as an example in the example of FIG. 24.

First, character information "John and Bob to current game and Youtube" is received as input information IN111 according to the speech by the user U1 who uses the terminal device 10. Then, the terminal device 10 transmits the input information IN111 to the information processing device 100. As a result, the information processing device 100 acquires the input information IN111 from the terminal device 10.

Then, the information processing device 100 estimates intent of the input information IN111 by the function of natural language understanding. The information processing device 100 estimates that the intent of the input information IN111 is an input of the input item "Friend" and an input item "Service". The information processing device 100 generates content CT111 that displays the input item of each function including the input item "Friend" or the input item "Service" that is the corresponding input item corresponding to the input information of the user U1 (Step S91). First, the information processing device 100 extracts, from among the functions, the function including the input item "Friend" or the input item "Service" as the input item. In the example of FIG. 24, the information processing device 100 extracts the function "Invitation", the function "Mail", the function "VoiceChat", and the like as the functions including the input item "Friend". Furthermore, the information processing device 100 extracts a function "Broadcast", a function "Video", and the like as the functions including the input item "Service".

Specifically, the information processing device 100 generates the content CT111 in which a panel PT111 in which "John" and "Bob" are set as parameters of the input item "Friend" is arranged in a left half and a panel PT112 in which "VideoS" is set as a parameter of the input item "Service" is arranged in a right half. In the example of FIG. 24, the information processing device 100 generates the panel PT111 in which "ActionG" is set as the parameter of the input item "Game" of the function "Invitation" since "ActionG" is already set as the parameter of the input item "Game". In the example of FIG. 24, the information processing device 100 lightens a color of information of the function "Mail" and the function "VoiceChat" other than the function "Invitation". As a result, the information processing device 100 can make information of the function "Invitation" on the panel PT111 distinguishable from the other information. Furthermore, the information processing device 100 generates the panel PT112 in which "VideoS" is set as the parameter of the input item "Service" and the function "Broadcast" and the function "Video" including the input item "Service" are displayed in a list.

Furthermore, since there is the executable function "Invitation" on a side of the panel PT111, the information processing device 100 generates the panel PT111 in an upper part of which information such as "Invitation" indicating that the function "Invitation" is specified as the function is arranged. In addition, since there is no executable function on a side of the panel PT112, the information processing device 100 generates the panel PT112 in which information such as "Action unidentified" indicating that the function is not specified is arranged in an upper part. As a result, the information processing device 100 generates the content CT111.

Then, the information processing device 100 transmits the content CT111 to the terminal device 10. The terminal device 10 displays the content CT111. As a result, the user U1 can check how his/her input is reflected, and can easily perform the subsequent input.

As described above, as indicated by the panels PT111 and PT11, in a case where a complex sentence or the like is spoken and the speech is over a plurality of functions, the information processing system 1 simultaneously displays a plurality of corresponding GUIs (panels). The plurality of possibilities is respectively displayed on the panels. As a result, the information processing system 1 can facilitate the input by the user.

[1-17. Procedure of Execution of a Function Related to the Information Processing System]

Figure 25:
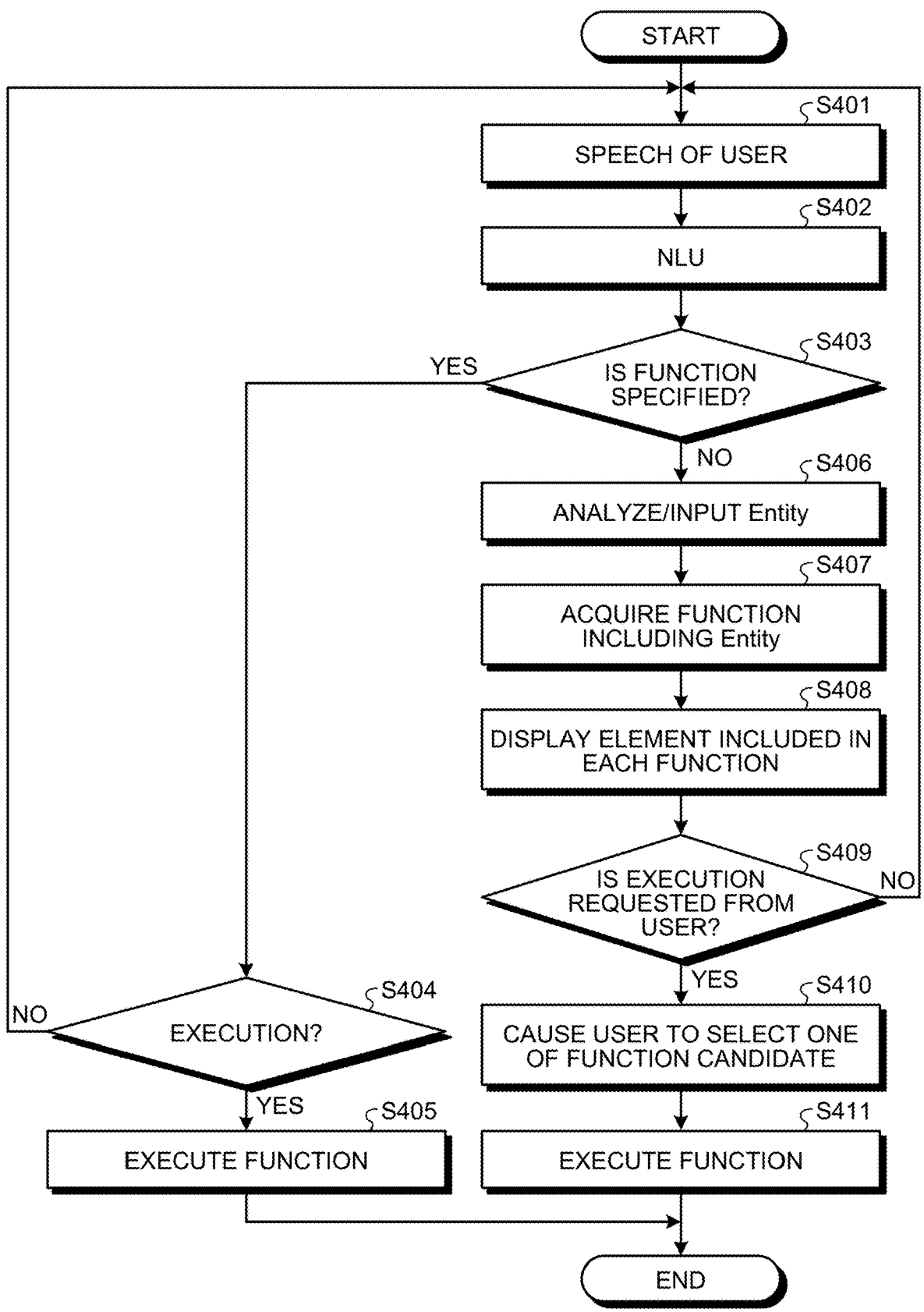
FIG. 25 is a flowchart illustrating a procedure of execution of a function according to the information processing system.

Next, a flow of processing until a function is executed in the information processing system 1 will be described with reference to FIG. 25. FIG. 25 is a flowchart illustrating a procedure of execution of a function according to the information processing system. Note that processing in each step may be performed by any device included in the information processing system 1, such as the information processing device 100 or the terminal device 10.

As illustrated in FIG. 25, the information processing system 1 detects speech by the user (Step S401). Then, the information processing system 1 executes processing of natural language understanding (NLU) (Step S402). Then, the information processing system 1 judges whether a function is specified (Step S403). For example, the information processing system 1 judges whether there is a function in which an essential input item is input.

In a case where the function is specified (Step S403: Yes), the information processing system 1 checks whether to execute the function (Step S404). For example, the information processing system 1 checks with the user whether to execute the specified function.

In a case where there is an instruction to execute the function (Step S405: Yes), the information processing system 1 executes the function (Step S405). Then, the information processing system 1 ends the processing. On the other hand, in a case where there is no instruction to execute the function (Step S405: No), the information processing system 1 returns to Step S401 and repeats the processing.

In addition, in a case where the function is not specified (Step S403: No), the information processing system 1 performs an Entity analysis and input (Step S406). In a case where the function is not specified, the information processing system 1 determines an input item corresponding to the speech by the user.

Then, the information processing system 1 acquires a function including the Entity (Step S407). For example, the information processing system 1 extracts a function including an input item corresponding to the speech by the user.

Furthermore, the information processing system 1 displays an element included in each function (Step S408). For example, the information processing system 1 displays an input item included in each function.

Furthermore, in a case where there is an execution request from the user (Step S409: Yes), the information processing system 1 causes the user to select which one of the function candidates is intended (Step S410). Then, the information processing system 1 executes the function selected by the user (Step S411). Then, the information processing system 1 ends the processing. On the other hand, in a case where there is no execution request from the user (Step S409: No), the information processing system 1 returns to Step S401 and repeats the processing.

2. Other Embodiments

The processing according to the above-described embodiments and modification examples may be performed in various different forms (modification examples) other than the above-described embodiments and modification examples.

[2-1. Other Configuration Examples]

Note that a case where the information processing device 100 and the terminal device 10 are separate bodies has been described in the above example. However, these devices may be integrated. That is, a device that generates content (such as information processing device 100) and a device that displays information such as content (such as terminal device 10) may be integrated. For example, a device used by the user may be an information processing device having a function of generating content and a function of displaying information or receiving an input by the user. In this case, for example, the information processing device may be a television or the like. The information processing device may acquire input information of the user from a terminal device (such as smart speaker or smartphone) that receives an input by the user, and generate and display content by using the acquired information.

[2-2. Others]

Also, among the pieces of processing described in the above embodiments, all or a part of the processing described to be automatically performed can be manually performed, or all or a part of the processing described to be manually performed can be automatically performed by a known method. In addition, a processing procedure, specific name, and information including various kinds of data and parameters illustrated in the above document or drawings can be arbitrarily changed unless otherwise specified. For example, various kinds of information illustrated in each drawing are not limited to the illustrated information.

Also, each component of each of the illustrated devices is a functional concept, and does not need to be physically configured in a manner illustrated in the drawings. That is, a specific form of distribution/integration of each device is not limited to what is illustrated in the drawings, and a whole or part thereof can be functionally or physically distributed/integrated in an arbitrary unit according to various loads and usage conditions.

Also, the above-described embodiments and modification examples can be arbitrarily combined in a range in which the processing contents do not contradict each other.

Also, an effect described in the present description is merely an example and is not a limitation, and there may be a different effect.

3. Effects According to the Present Disclosure

As described above, an information processing device (information processing device 100 in the embodiment) according to the present disclosure includes an acquisition unit (acquisition unit 131 in the embodiment), a generation unit (generation unit 133 in the embodiment), and a transmission unit (transmission unit 134 in the embodiment). The acquisition unit acquires, from a terminal device (terminal device 10 in the embodiment), input information input to the terminal device by a user. The generation unit generates content of displaying an input item of each function including a corresponding input item that is an input item corresponding to the input information. The transmission unit transmits the content generated by the generation unit to the terminal device.

In such a manner, the information processing device according to the present disclosure generates the content of displaying the input item of each function including the corresponding input item that is the input item in response to the input to the terminal device by the user, and performs transmission thereof to the terminal device. As a result, the information processing device can facilitate the input by the user by making it possible to present, to the user, the input item corresponding to the input by the user.

In addition, the generation unit generates content of displaying a union of input items of the functions. As a result, the information processing device can facilitate the input by the user by making it possible to present, to the user, information of the union of the input items of the functions.

Furthermore, in a case where a first input item of a first function including the corresponding input item and a second input item of a second function including the corresponding input item are common, the generation unit generates content of displaying the input items of the functions with the first input item and the second input item as one input item. As a result, the information processing device can facilitate the input by the user by making it possible to suppress an overlapping display of common input items and to present only necessary information to the user.

Furthermore, the generation unit generates content of displaying a parameter corresponding to the corresponding input item based on the input information together with the corresponding input item. As a result, the information processing device can facilitate the input by the user by making it possible to distinguishably present, to the user, an input item for which a parameter is already input and an input item for which the input is necessary.

Furthermore, the generation unit generates content of displaying each function together with an input item of each function. As a result, the information processing device can facilitate the input by the user by making it possible to present, to the user, which input item of which function needs the input.

Furthermore, the generation unit generates content of displaying the corresponding input item in a manner of being distinguishable from the other input items. As a result, the information processing device can facilitate the input by the user by making it possible to present, to the user, the corresponding input item in a manner of being distinguishable from the other input items.

Furthermore, the generation unit generates a dialog box into which a parameter corresponding to the corresponding input item is input. The transmission unit transmits the dialog box generated by the generation unit to the terminal device. As a result, the information processing device can facilitate the input by the user by making it possible to cause the user to recognize that the input of the parameter of the corresponding input item is received.

Furthermore, the acquisition unit acquires input information input to the terminal device by voice by the user. As a result, the information processing device can facilitate the voice input by the user by making it possible to present, to the user, the input item corresponding to the voice input by the user.

Furthermore, the acquisition unit acquires input information input to the terminal device by operation by the user. As a result, the information processing device can facilitate the input to the terminal device by the operation by the user by making it possible to present, to the user, the input item corresponding to the input to the terminal device by the operation by the user.

As described above, a display device according to the present disclosure (terminal device 10 in the embodiment) includes a transmission unit (transmission unit 154 in the embodiment), a receiving unit (receiving unit 151 in the embodiment), and a display unit (display unit 16 in the embodiment). The transmission unit transmits the input information input by the user to a server device (information processing device 100 in the embodiment). The receiving unit receives, from the server device, content of displaying an input item of each function including a corresponding input item that is an input item corresponding to the input information. The display unit displays the input item of each function including the corresponding input item by displaying the content received by the receiving unit.

As described above, by transmitting the input information input by the user to the server device and displaying the content of displaying the input item of each function including the corresponding input item corresponding to the input information received from the server device, the display device according to the present disclosure can present, to the user, the input item corresponding to the input by the user and can facilitate the input by the user.

Furthermore, the receiving unit receives content of displaying a union of the input items of the functions. The display unit displays the union of the input items of the functions. As a result, the display device can present information of the union of the input items of the functions to the user and can facilitate the input by the user.

Furthermore, in a case where the first input item of the first function including the corresponding input item and the second input item of the second function including the corresponding input item are common, the receiving unit receives the content of displaying the input items of the functions with the first input item and the second input item as one input item. The display unit displays the input items of the functions with the first input item and the second input item as the one input item. As a result, the display device can suppress an overlapping display of common input items, present only necessary information to the user, and facilitate the input by the user.

Furthermore, the receiving unit receives the content of displaying the parameter corresponding to the corresponding input item based on the input information together with the corresponding input item. The display unit displays the parameter together with the corresponding input item. As a result, the display device can distinguishably present, to the user, an input item for which a parameter is already input and an input item for which the input is necessary, and can facilitate the input by the user.

In addition, the receiving unit receives the content of displaying each function together with an input item of each function. The display unit displays each function together with the input item of each function. As a result, the display device can present, to the user, which input item of which function needs the input, and can facilitate the input by the user.

Furthermore, the receiving unit receives the content of displaying the corresponding input item in a manner of being distinguishable from the other input items. The display unit displays the corresponding input item in a manner of being distinguishable from the other input items. As a result, the display device can present, to the user, the corresponding input item in a manner of being distinguishable from the other input items, and can facilitate the input by the user.

Furthermore, the receiving unit receives the dialog box into which the parameter corresponding to the corresponding input item is input. The display unit displays the dialog box received by the receiving unit. The transmission unit transmits the dialog box generated by the generation unit to the terminal device. As a result, the display device can facilitate the input by the user by making it possible to cause the user to recognize that the input of the parameter of the corresponding input item is received.

Furthermore, the transmission unit transmits the input information input by the voice by the user to the server device. As a result, the display device can present, to the user, the input item corresponding to the voice input by the user, and can facilitate the voice input by the user.

Furthermore, the transmission unit transmits the input information input by the operation by the user to the server device. As a result, the display device can present, to the user, the input item corresponding to the input by the operation by the user, and can facilitate the input to the terminal device by the operation by the user.

4. Hardware Configuration

Figure 26:
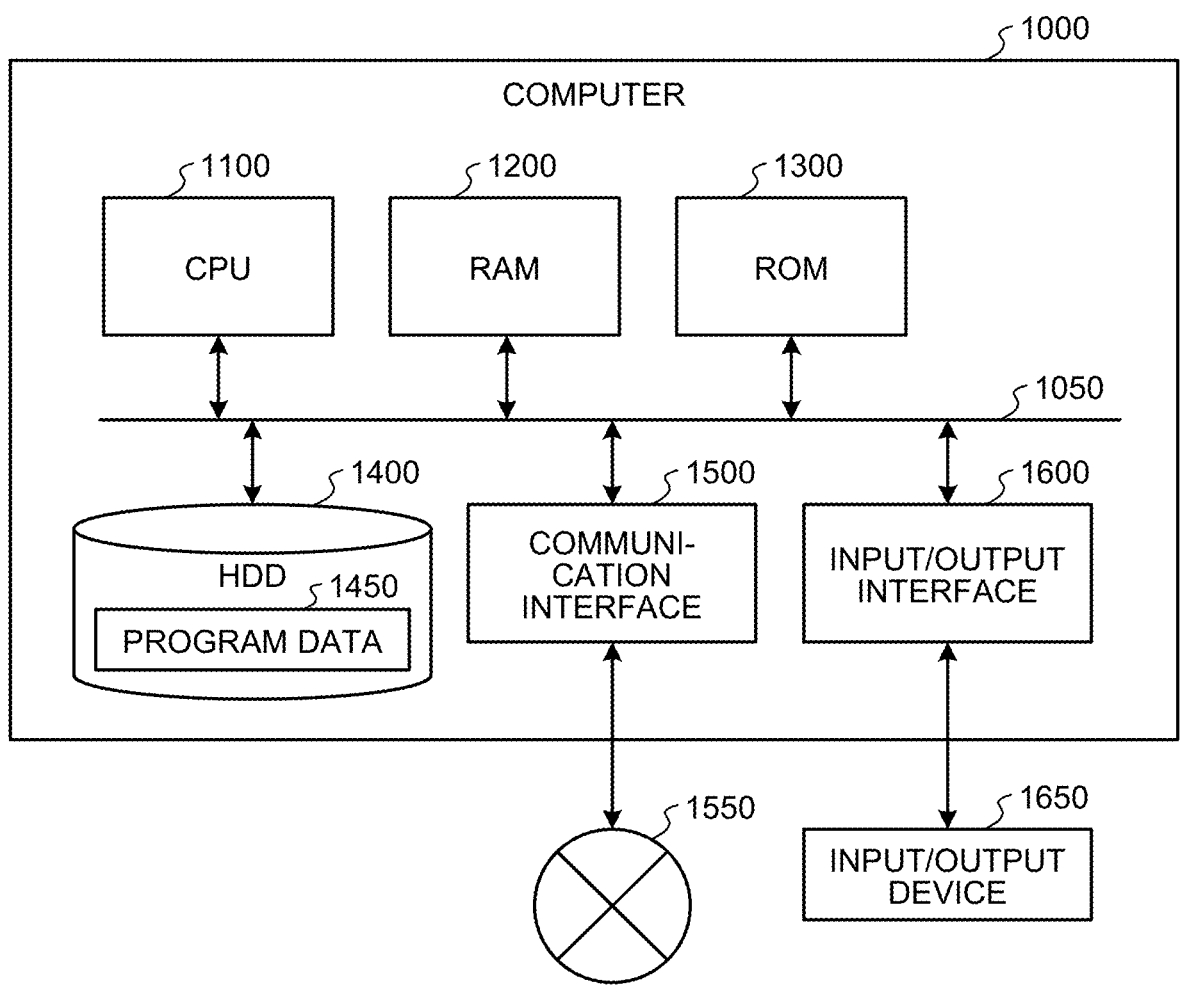
FIG. 26 is a hardware configuration diagram illustrating an example of a computer that realizes an information processing device and functions of the information processing device.

Information equipment such as the information processing device 100 and the terminal device 10 according to each of the above-described embodiments and modification examples is realized by, for example, a computer 1000 having a configuration in a manner illustrated in FIG. 26. FIG. 26 is a hardware configuration diagram illustrating an example of the computer 1000 that realizes functions of an information processing device such as the information processing device 100 or the terminal device 10. In the following, the information processing device 100 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates on the basis of programs stored in the ROM 1300 or the HDD 1400, and controls each unit. For example, the CPU 1100 expands the programs, which are stored in the ROM 1300 or the HDD 1400, in the RAM 1200 and executes processing corresponding to the various programs.

The ROM 1300 stores a boot program such as a basic input output system (BIOS) executed by the CPU 1100 during activation of the computer 1000, a program that depends on hardware of the computer 1000, and the like.

The HDD 1400 is a computer-readable recording medium that non-temporarily records a program executed by the CPU 1100, data used by the program, and the like. More specifically, the HDD 1400 is a recording medium that records the information processing program according to the present disclosure which program is an example of program data 1450.

The communication interface 1500 is an interface with which the computer 1000 is connected to an external network 1550 (such as the Internet). For example, the CPU 1100 receives data from another equipment or transmits data generated by the CPU 1100 to another equipment via the communication interface 1500.

The input/output interface 1600 is an interface to connect an input/output device 1650 and the computer 1000. For example, the CPU 1100 receives data from an input device such as a keyboard or mouse via the input/output interface 1600. Also, the CPU 1100 transmits data to an output device such as a display, speaker, or printer via the input/output interface 1600. Also, the input/output interface 1600 may function as a medium interface that reads a program or the like recorded on a predetermined recording medium (medium). The medium is, for example, an optical recording medium such as a digital versatile disc (DVD) or phase change rewritable disk (PD), a magneto-optical recording medium such as a magneto-optical disk (MO), a tape medium, a magnetic recording medium, a semiconductor memory, or the like.

For example, in a case where the computer 1000 functions as the information processing device 100 according to the embodiment, the CPU 1100 of the computer 1000 realizes a function of the control unit 130 or the like by executing the information processing program loaded on the RAM 1200. Also, the HDD 1400 stores an information processing program according to the present disclosure, and data in the storage unit 120. Note that the CPU 1100 reads the program data 1450 from the HDD 1400 and performs execution thereof, but may acquire these programs from another device via the external network 1550 in another example.

Note that the present technology can also have the following configurations.

(1)

An information processing device comprising:

an acquisition unit that acquires, from a terminal device, input information input to the terminal device by a user;

a generation unit that generates content of displaying an input item of each of functions including a corresponding input item that is an input item corresponding to the input information; and a transmission unit that transmits the content generated by the generation unit to the terminal device.

(2) The information processing device according to (1), wherein
the generation unit
generates the content of displaying a union of the input items of the functions.

(3) The information processing device according to (2), wherein
the generation unit
generates, in a case where a first input item of a first function including the corresponding input item and a second input item of a second function including the corresponding input item are common, the content of displaying the input items of the functions with the first input item and the second input item as one input item.

(4) The information processing device according to any one of (1) to (3), wherein
the generation unit
generates the content of displaying a parameter corresponding to the corresponding input item based on the input information together with the corresponding input item.

(5) The information processing device according to any one of (1) to (4), wherein
the generation unit
generates the content of displaying each of the functions together with the input item of each of the functions.

(6) The information processing device according to any one of (1) to (5), wherein
the generation unit
generates the content of displaying the corresponding input item in a manner of being distinguishable from the other input items.

(7) The information processing device according to any one of (1) to (6), wherein
the generation unit
generates a dialog box into which a parameter corresponding to the corresponding input item is input, and
the transmission unit
transmits the dialog box generated by the generation unit to the terminal device.

(8) The information processing device according to any one of (1) to (7), wherein
the acquisition unit
acquires the input information input to the terminal device by voice by the user.

(9) The information processing device according to any one of (1) to (8), wherein
the acquisition unit
acquires the input information input to the terminal device by operation by the user.

(10) An information processing method comprising:
executing processing of
acquiring, from a terminal device, input information input to the terminal device by a user,
generating content of displaying an input item of each of functions including a corresponding input item that is an input item corresponding to the input information, and
transmitting the generated content to the terminal device.

(11) A display device comprising:
a transmission unit that transmits, to a server device, input information input by a user;
a receiving unit that receives, from the server device, content of displaying an input item of each of functions including a corresponding input item that is an input item corresponding to the input information; and
a display unit that displays the input item of each of the functions including the corresponding input item by displaying the content received by the receiving unit.

(12) The display device according to (11), wherein
the receiving unit
receives the content of displaying a union of the input items of the functions, and
the display unit
displays the union of the input items of the functions.

(13) The display device according to (12), wherein
the receiving unit
receives, in a case where a first input item of a first function including the corresponding input item and a second input item of a second function including the corresponding input item are common, the content of displaying the input items of the functions with the first input item and the second input item as one input item, and
the display unit
displays the input items of the functions with the first input item and the second input item as the one input item.

(14) The display device according to any one of (11) to (13), wherein
the receiving unit
receives the content of displaying a parameter corresponding to the corresponding input item based on the input information together with the corresponding input item, and
the display unit
displays the parameter together with the corresponding input item.

(15) The display device according to any one of (11) to (14), wherein
the receiving unit
receives the content of displaying each of the functions together with the input item of each of the functions, and
the display unit
displays each of the functions together with the input item of each of the functions.

(16) The display device according to any one of (11) to (15), wherein
the receiving unit
receives the content of displaying the corresponding input item in a manner of being distinguishable from the other input items, and
the display unit
displays the corresponding input item in the manner of being distinguishable from the other input items.

(17) The display device according to any one of (11) to (16), wherein
the receiving unit
receives a dialog box into which a parameter corresponding to the corresponding input item is input, and
the display unit
displays the dialog box received by the receiving unit.

(18)

The display device according to any one of (11) to (17), wherein the transmission unit transmits, to the server device, the input information input by voice by the user.

(19)

The display device according to any one of (11) to (18), wherein the transmission unit transmits, to the server device, the input information input by operation by the user.

(20)

A display method comprising:

executing processing of transmitting, to a server device, input information input by a user, receiving, from the server device, content of displaying an input item of each of functions including a corresponding input item that is an input item corresponding to the input information, and displaying the input item of each of the functions including the corresponding input item by displaying the received content.

REFERENCE SIGNS LIST

1 INFORMATION PROCESSING SYSTEM
100 INFORMATION PROCESSING DEVICE
110 COMMUNICATION UNIT
120 STORAGE UNIT
121 FUNCTION INFORMATION STORAGE UNIT
122 USER INFORMATION STORAGE UNIT
123 INPUT INFORMATION STORAGE UNIT
124 CONTENT GENERATION INFORMATION STORAGE UNIT
130 CONTROL UNIT
131 ACQUISITION UNIT
132 DETERMINATION UNIT
133 GENERATION UNIT
134 TRANSMISSION UNIT
10 TERMINAL DEVICE (DISPLAY DEVICE)
11 COMMUNICATION UNIT
12 INPUT UNIT
13 OUTPUT UNIT
14 STORAGE UNIT
15 CONTROL UNIT
151 RECEIVING UNIT
152 DISPLAY CONTROL UNIT
153 RECEPTION UNIT
154 TRANSMISSION UNIT
16 DISPLAY UNIT

The invention claimed is:

1. An information processing device comprising:

acquisition circuitry configured to acquire, from a terminal device, first input information input to the terminal device by a user;

determination circuitry configured to determine, from among a plurality of input items available in the information processing device, a first corresponding input item corresponding to the first input information, and determine, from among a plurality of functions available in the information processing device, a plurality of candidate functions that relate to the first corresponding input item, each of the plurality of functions having at least one input item each to be provided with a parameter input by the user;

generation circuitry configured to generate content of displaying input items relating to at least one of the plurality of candidate functions that are determined as relating to the first corresponding input item; and a transmitter configured to transmit the content generated by the generation circuitry to the terminal device, wherein the acquisition circuitry is further configured to acquire, from the terminal device, second input information input to the terminal device by the user, the determination circuitry is further configured to determine a second corresponding input item corresponding to the second input information, and determine a subset of the plurality of candidate functions that additionally relate to the second corresponding input item, the generation circuitry is further configured to generate modified content of displaying input items relating to the subset of the plurality of candidate functions that are determined as additionally relating to the second corresponding input item, and the transmitter is further configured to transmit the modified content to the terminal device.

2. The information processing device according to claim 1, wherein the generation circuitry is further configured to generate the content of displaying a union of the input items relating to at least one of the plurality of candidate functions that are determined as relating to the first corresponding input item.

3. The information processing device according to claim 2, wherein the generation circuitry is further configured to generate, in a case where a first input item that relates to a first candidate function relating to the first corresponding input item and a second input item that relates to a second candidate function also relating to the first corresponding input item are common, the content of displaying the first input item and the second input item as one input item.

4. The information processing device according to claim 1, wherein the generation circuitry is further configured to generate the content of further displaying a parameter corresponding to the first corresponding input item based on the first input information together with the first corresponding input item.

5. The information processing device according to claim 1, wherein the generation circuitry is further configured to generate the content of further displaying each of the plurality of candidate functions that are determined as relating to the first corresponding input item, together with the input item of each of the plurality of candidate functions.

6. The information processing device according to claim 1, wherein the generation circuitry is further configured to generate the content of displaying the first corresponding input item in a manner of being distinguishable from the other input items displayed in the content.

7. The information processing device according to claim 1, wherein
the generation circuitry is further configured to generate content of a dialog box into which a parameter corresponding to the first corresponding input item is input, and
the transmitter is further configured to transmit the content of the dialog box generated by the generation circuitry to the terminal device.

8. The information processing device according to claim 1, wherein
the acquisition circuitry is further configured to acquire the first and second input information input to the terminal device by voice by the user.

9. The information processing device according to claim 1, wherein
the acquisition circuitry is further configured to acquire the first and second input information input to the terminal device by operation by the user.

10. An information processing method executed by an information processing device, the method comprising:
acquiring, from a terminal device, first input information input to the terminal device by a user;
determining, from among a plurality of input items available in the information processing device, a first corresponding input item corresponding to the first input information;
determining, from among a plurality of functions available in the information processing device, a plurality of candidate functions that relate to the first corresponding input item, each of the plurality of functions having at least one input item each to be provided with a parameter to be input by the user;
generating content of displaying input items relating to at least one of the plurality of candidate functions that are determined as relating to the first corresponding input item; and
transmitting the content to the terminal device, wherein the method further comprises
acquiring, from the terminal device, second input information input to the terminal device by the user,
determining a second corresponding input item corresponding to the second input information,
determining a subset of the plurality of candidate functions that additionally relate to the second corresponding input item,
generating modified content of displaying input items relating to the subset of the plurality of candidate functions that are determined as additionally relating to the second corresponding input item, and
transmitting the modified content to the terminal device.

11. A display device comprising:
a transmitter configured to transmit, to a server device, first input information input by a user, and cause the server device to determine, from among a plurality of input items available in the server device, a first corresponding input item corresponding to the first input information transmitted by the transmitter, and further determine, from among a plurality of functions available in the server device, a plurality of candidate functions that relate to the first corresponding input item, each of the plurality of functions having at least one input item each to be provided with a parameter to be input by the user;
receiving circuitry configured to receive, from the server device, content of displaying input items relating to at least one of the plurality of candidate functions that are determined as relating to the first corresponding input item; and
a display configured to display the content received by the receiving circuitry, wherein
the transmitter is further configured to transmit, to the server device, second input information input by the user and cause the server device to determine a second corresponding input item corresponding to the second input information, and further determine a subset of the plurality of candidate functions that additionally relate to the second corresponding input item,
the receiving circuitry is further configured to receive, from the server device, modified content of displaying input items relating to the subset of the plurality of candidate functions that are determined as additionally relating to the second corresponding input item, and
the display is further configured to display the modified content received by the receiving circuitry.

12. The display device according to claim 11, wherein
the receiving circuitry is further configured to receive the content of displaying a union of the input items relating to at least one of the plurality of candidate functions that the server device determines as relating to the first corresponding input item, and
the display is further configured to display the content received by the receiving circuitry.

13. The display device according to claim 12, wherein
the receiving circuitry is further configured to receive, in a case where a first input item that relates to a first candidate function relating to the first corresponding input item and a second input item that relates to a second candidate function also relating to the first corresponding input item are common, the content of displaying the first input item and the second input item as one input item, and
the display is further configured to display the content received by the receiving circuitry.

14. The display device according to claim 11, wherein
the receiving circuitry is further configured to receive the content of further displaying a parameter corresponding to the first corresponding input item based on the first input information together with the first corresponding input item, and
the display is further configured to display the content received by the receiving circuitry.

15. The display device according to claim 11, wherein
the receiving circuitry is further configured to receive the content of further displaying each of the plurality of candidate functions that are determined as relating to the first corresponding input item, together with the input item of each of the plurality of candidate functions, and
the display is further configured to display the content received by the receiving circuitry.

16. The display device according to claim 11, wherein
the receiving circuitry is further configured to receive the content of displaying the first corresponding input item in a manner of being distinguishable from the other input items displayed in the content, and
the display is further configured to display the content received by the receiving circuitry.

17. The display device according to claim 11, wherein
the receiving circuitry is further configured to receive, from the server device, content of a dialog box into which a parameter corresponding to the first corresponding input item is input, and the display is configured to display the content of the dialog box received by the receiving circuitry.

18. The display device according to claim 11, wherein the transmitter is further configured to transmit, to the server device, the first and second input information input by voice by the user.

19. The display device according to claim 11, wherein the transmitter is further configured to transmit, to the server device, the first and second input information input by operation by the user.

20. A display method executed by a display device, the method comprising:

transmitting, to a server device, first input information input by a user and causing the server device to determine, from among a plurality of input items available in the server device, a first corresponding input item corresponding to the first input information, and further determine, from among a plurality of functions available in the server device, a plurality of candidate functions that relate to the first corresponding input item, each of the plurality of functions having at least one input item each to be provided with a parameter input by the user;

receiving, from the server device, content of displaying input items relating to at least one of the plurality of candidate functions that are determined as relating to the first corresponding input item;

displaying the received content;

further transmitting, to the server device, second input information input by the user and causing the server device to determine a second corresponding input item corresponding to the second input information, and further determine a subset of the plurality of candidate functions that additionally relate to the second corresponding input item;

further receiving, from the server device, modified content of displaying input items relating to the subset of the plurality of candidate functions that are determined as additionally relating to the second corresponding input item; and further displaying the modified content.

* * * * *